United States Patent
Seo et al.

(10) Patent No.: US 10,095,851 B2
(45) Date of Patent: Oct. 9, 2018

(54) ELECTRONIC DEVICE AND INPUTTED SIGNATURE PROCESSING METHOD OF ELECTRONIC DEVICE

(71) Applicant: Samsung Electronics Co., Ltd., Suwon-si, Gyeonggi-do (KR)

(72) Inventors: Jang-Seok Seo, Suwon-si (KR); Kyu-Young Kim, Hwaseong-si (KR); Ki-Hoon Nam, Suwon-si (KR); Tae-Gun Park, Yongin-si (KR); Kyoon-Tae Bong, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/915,013

(22) PCT Filed: Aug. 28, 2014

(86) PCT No.: PCT/KR2014/008019
§ 371 (c)(1),
(2) Date: Feb. 26, 2016

(87) PCT Pub. No.: WO2015/030500
PCT Pub. Date: Mar. 5, 2015

(65) Prior Publication Data
US 2016/0210453 A1    Jul. 21, 2016

(30) Foreign Application Priority Data
Aug. 30, 2013   (KR) .................. 10-2013-0104377
Aug. 30, 2013   (KR) .................. 10-2013-0104397

(51) Int. Cl.
*H04L 29/06* (2006.01)
*G06F 21/32* (2013.01)
(Continued)

(52) U.S. Cl.
CPC .......... *G06F 21/32* (2013.01); *G06F 3/04883* (2013.01); *G06F 21/36* (2013.01); *G06K 9/00181* (2013.01)

(58) Field of Classification Search
CPC ........................... G06F 21/31; G06F 3/04883
See application file for complete search history.

(56) References Cited

U.S. PATENT DOCUMENTS 5,647,017 A * 7/1997 Smithies ............ G06K 9/00154
340/5.86
2002/0158848 A1  10/2002 Sekendur
(Continued)

FOREIGN PATENT DOCUMENTS

CN   1492365 A       4/2004
EP   1028391 A1 *   8/2000  ......... G06K 9/00154
(Continued)

*Primary Examiner* — Jason K Gee
(74) *Attorney, Agent, or Firm* — Jefferson IP Law, LLP

(57) ABSTRACT

An operation method of an electronic device is provided. The operation method includes registering, as reference signature data, at least one handwritten signature inputted into the electronic device by a user input means, authenticating an inputted handwritten signature by comparing data of the inputted handwritten signature with the registered reference signature data when the handwritten signature is inputted by the user input means, and further registering, as reference signature data, handwritten signature data regarding the inputted handwritten signature when the inputted handwritten signature is authenticated normally as a result of the authentication.

10 Claims, 14 Drawing Sheets

(51) Int. Cl.
    *G06F 3/0488*     (2013.01)
    *G06F 21/36*     (2013.01)
    *G06K 9/00*     (2006.01)

(56) References Cited

U.S. PATENT DOCUMENTS

| | | |
|---|---|---|
| 2003/0138135 A1 | 7/2003 | Chung et al. |
| 2003/0233557 A1 | 12/2003 | Zimmerman |
| 2004/0255128 A1 | 12/2004 | Ohba |
| 2007/0083763 A1 | 4/2007 | Itoh et al. |
| 2008/0049986 A1 | 2/2008 | Arai |
| 2008/0152202 A1 | 6/2008 | Moise et al. |
| 2010/0254578 A1* | 10/2010 | Modir Shanechi ............ G06K 9/00167 382/119 |
| 2012/0084078 A1 | 4/2012 | Moganti et al. |
| 2014/0375573 A1* | 12/2014 | Idzik ............ G06F 3/0383 345/173 |

FOREIGN PATENT DOCUMENTS

| | | |
|---|---|---|
| JP | 3068790 U | 5/2000 |
| JP | 2000-353243 A | 12/2000 |
| JP | 2002-009761 A | 1/2002 |
| JP | 2007-110180 A | 4/2007 |
| JP | 2007-299226 A | 11/2007 |
| KR | 10-2007-0066548 A | 6/2007 |
| KR | 10-2007-0110335 A | 11/2007 |
| KR | 10-2013-0071478 A | 6/2013 |
| WO | 2012/144105 A1 | 10/2012 |

\* cited by examiner

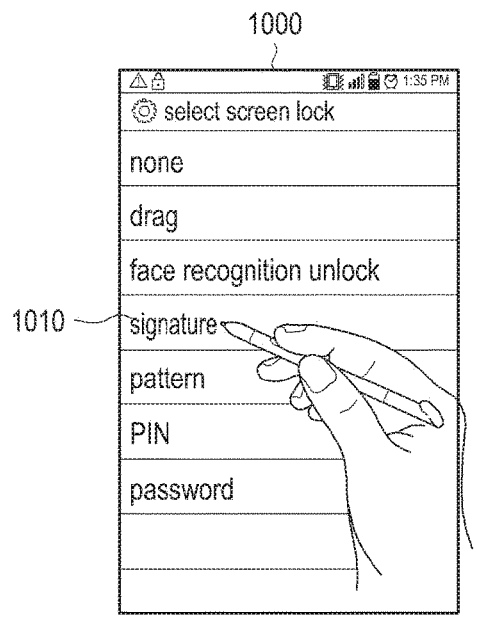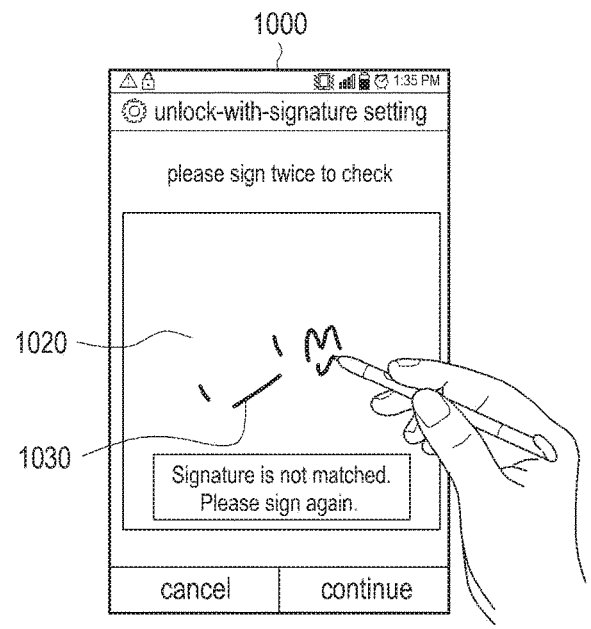
FIG.10A　　FIG.10B
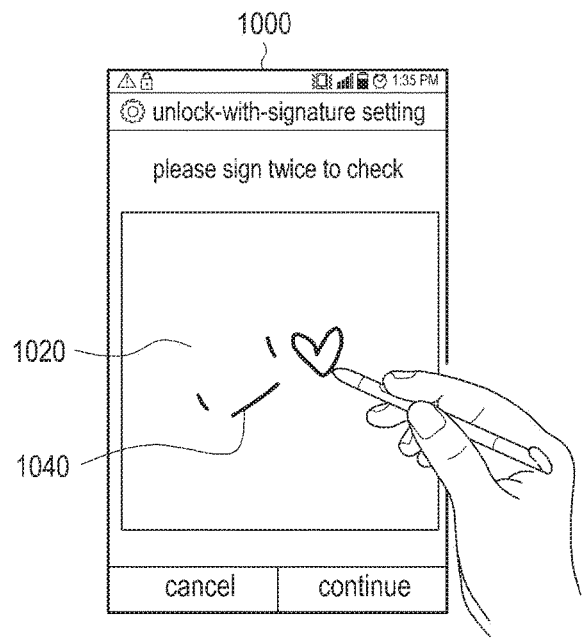
FIG.10C

ELECTRONIC DEVICE AND INPUTTED SIGNATURE PROCESSING METHOD OF ELECTRONIC DEVICE

CROSS-REFERENCE TO RELATED APPLICATION(S)

This application is a U.S. National Stage application under 35 U.S.C. § 371 of an International application filed on Aug. 28, 2014 and assigned application number PCT/KR2014/008019, which claimed the benefit of a Korean patent application filed on Aug. 30, 2013 in the Korean Intellectual Property Office and assigned Serial number 10-2013-0104377, and of a Korean patent application filed on Aug. 30, 2013 in the Korean Intellectual Property Office and assigned Serial number 10-2013-0104397, the entire disclosure of which is hereby incorporated by reference.

TECHNICAL FIELD

The present disclosure relates to an electronic device and a signature input processing method of an electronic device.

BACKGROUND

A touch screen acts as a display unit that displays the screen of an electronic device, and also serves as an input module that detects a touch of a user and receives input data. The touch screen may detect a touch of a body part (for example, a finger), or a touch of an electronic pen, through a touch panel that is embodied based on a capacitive scheme or a resistive scheme. In addition to detecting a touch, the touch screen may convert a user's handwriting into an image or a document, and may store the same. To store the user's handwriting as an image or a document, a display of an electronic device (for example, a touch screen) needs to be activated and the content input by the user may be determined.

Recently, as the field of use of electronic devices has been expanded, such as Internet banking using an electronic device or the like, systems also have been developed from the perspective that various authentication processes are used for the use of those functions. Accordingly, as a representative method of providing security associated with authentication and convenience to users, a method of executing authentication by verifying a signature input by a user is suggested.

For example, a method is conducted that enables a personal signature, which used to be handwritten on a paper, to be input into an electronic device with an electronic pen or a finger, and authenticates the right through comparison and recognition.

In the signature verifying method, accuracy and immediacy in association with verifying a signature are important. However, since it is difficult for a user to regularly sign an autograph, the success rate of the verification of a signature may vary, which is inconvenient.

Also, a signature registering method of the related art defines and uses a standard for the number of signature recognition training times as a fixed value, and thus, various features of a signature of each user may not be reflected, which is a drawback.

Also, a method of storing and utilizing signature recognition data may fail to utilize various pieces of information associated with an environment where a signature is input.

The above information is presented as background information only to assist with an understanding of the present disclosure. No determination has been made, and no assertion is made, as to whether any of the above might be applicable as prior art with regard to the present disclosure.

SUMMARY

According to various embodiments of the present disclosure, for example, when signature recognition data is generated, not only the data stored as many times as the number of times that training is executed is used, but also user signature data cumulated to previously stored training data based on a result of authentication is used as additional data.

Also, according to various embodiments of the present disclosure, for example, accurate recognition may be executed by storing information for distinguishing a user signature recognition state together when signature training data is stored, and executing authentication by reflecting the same when the verification of a signature is executed.

Also, according to various embodiments of the present disclosure, for example, accurate recognition may be executed by adjusting a signature recognition standard based on the accuracy of signature recognition data additionally input when the authentication of a signature is executed.

Also, according to various embodiments of the present disclosure, for example, a method of storing and utilizing signature recognition data may increase the rate of recognition of a signature by utilizing various information associated with an environment where a signature is input.

Aspects of the present disclosure are to address at least the above-mentioned problems and/or disadvantages and to provide at least the advantages described below. Accordingly, an aspect of the present disclosure is to provide an electronic device that improves the accuracy of signature verification in association with a handwritten input, and further provides a signature input processing method of the electronic device.

In accordance with an aspect of the present disclosure, a method for an electronic device to process a signature input is provided. The method includes registering, as reference signature data, at least one handwritten signature input by a user input means in the electronic device, when a handwritten signature is input by the user input means, comparing the input handwritten signature data and the registered reference signature data so as to authenticate the input handwritten signature, and when a result of the authentication shows that the input handwritten signature is normally authenticated, additionally registering handwritten signature data associated with the input handwritten signature as reference signature data.

In accordance with another aspect of the present disclosure, an electronic device is provided. The electronic device includes a storage unit configured to store at least one registered handwritten signature as reference signature data, a touch screen configured to receives a handwritten signature that is input, and a controller configured to execute a process to compare input handwritten signature data and the registered reference signature data when a handwritten signature is input by a user input means, so as to authenticate the input handwritten signature, and to additionally register handwritten signature data associated with the input handwritten signature as reference signature data when a result of the authentication shows that the input handwritten signature is normally authenticated.

In accordance with another aspect of the present disclosure, a method for an electronic device to process a signature input is provided. The method includes registering, as reference signature data, at least one handwritten signature input by a user input means in the electronic device, when the handwritten signature is registered, registering at least one piece of signature related information, which is related to the handwritten signature, and when a handwritten signature is input for signature authentication, comparing input handwritten signature data and the registered handwritten signature data, so as to authenticate the input handwritten signature, wherein the authentication is executed by further taking into consideration at least one piece of registered signature related information.

In accordance with another aspect of the present disclosure, an electronic device is provided. The electronic device includes a storage unit configured to store at least one registered handwritten signature as reference signature data, a touch screen configured to receive a handwritten signature that is input, and a controller configured to execute a process to compare input handwritten signature data and the registered handwritten signature data when a handwritten signature is input by a user input means, so as to authenticate the input handwritten signature, wherein the authentication is executed by further taking into consideration at least one piece of registered signature related information.

According to various embodiments of the present disclosure, various features of the signature of a user may be secured, and the recognition rate of the user's signature may increase and the recognition rate of other's signatures may decrease.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A to 10C are diagrams illustrating an example of registering a signature in an electronic device according to various embodiments of the present disclosure;

Throughout the drawings, it should be noted that like reference numbers are used to depict the same or similar elements, features, and structures.

DETAILED DESCRIPTION

Figure 1:
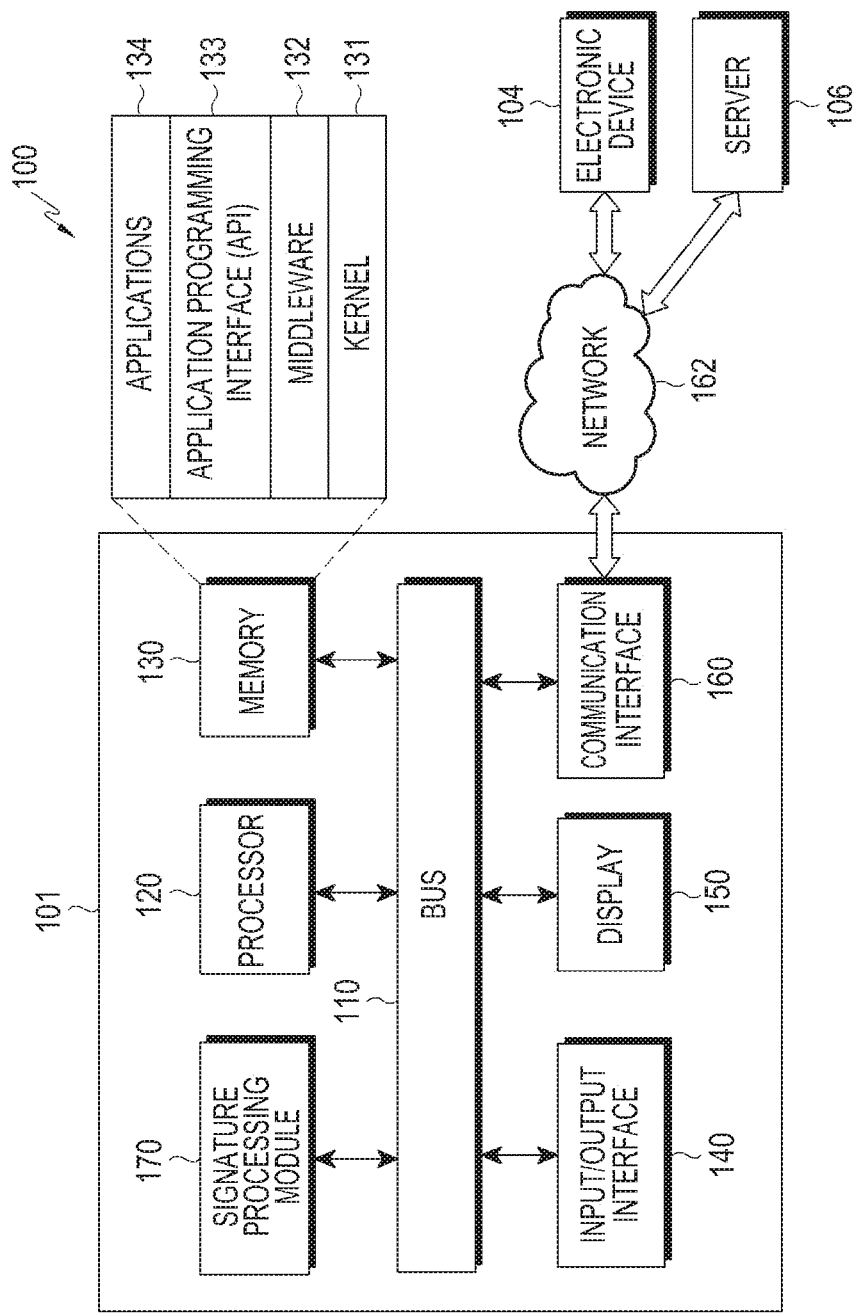
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the terms "include" or "may include", which may be used in various embodiments of the present disclosure, refer to the presence of disclosed functions, operations or elements, and do not restrict the addition of one or more functions, operations or elements. Further, as used in various embodiments of the present disclosure, the terms "include", "have", and their conjugates are intended merely to denote a certain feature, numeral, operation, element, component, or a combination thereof, and should not be construed to initially exclude the existence of or a possibility of addition of one or more other features, numerals, operations, elements, components, or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expressions such as "first," "second," or the like used in various embodiments of the present disclosure may modify various component elements in the various embodiments but may not limit corresponding component elements. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be, but is not limited to, a device including a touch screen. The entity, for example, may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, and a wearable device (e.g., a head-mounted-device (HMD) such as electronic glasses, electronic clothes, an electronic bracelet, an electronic necklace, an electronic appcessory, an electronic tattoo, or a smartwatch).

According to various embodiments of the present disclosure, the electronic device may be a smart home appliance including a touch screen. The smart home appliances may include at least one of, for example, televisions (TVs), digital versatile disc (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to various embodiments of the present disclosure, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

According to various embodiments of the present disclosure, when data for signature recognition is generated, not only training data stored as many times as a predetermined number is used, but also signature data input when authentication is executed is cumulated and utilized in addition to previously stored reference signature data for authentication. Accordingly, various features of the signature of a user may be secured, and the recognition rate of the user's signature may increase and the recognition rate of other's signatures may decrease.

Various embodiments of the present disclosure may contain a database that stores signature recognition data, and may include executing a procedure for a signature recognition training test and a signature recognition and comparison procedure.

Also, various embodiments of the present disclosure may further store grip state information when a signature is input, input means information when a signature is input, or the like, as information for distinguishing a signature recognition state, and may use the same as signature related information for authenticating a signature.

According to various embodiments of the present disclosure, a user may execute a process of registering a signature of the user in order to use signature recognition. Training data may be received as many times as a predetermined number predetermined by a signature recognition training test procedure set in the signature registration process. For example, when the predetermined number set for inputting training data is 3, the training data input three times may be stored as reference signature data.

Also, according to various embodiments of the present disclosure, the accuracy of the authentication of a signature may increase by additionally storing information for distinguishing a signature recognition state when a user uses signature recognition. Examples of the information of distinguishing the signature recognition state may include a grip state associated with a signature input means, a type of a signature input means, or the like, but the present disclosure may not be limited thereto.

For example, grip state distinguishing information of a user who inputs a signature may be used when signature recognition training for the user is set or when signature recognition associated with the user is executed. The grip state is classified as a state in which a user grips an electronic device, a state in which a user does not grip an electronic device, or the like. As described above, when the grip state information of a user is additionally stored as signature related information and is used when authentication of a signature is executed, signature recognition may be implemented accurately.

Also, according to various embodiments of the present disclosure, when an input means used for inputting a signature is distinguished and reflected when authentication is executed, signature recognition may be implemented accurately. For example, signature data when a user inputs a signature with a hand and signature data when the user inputs a signature with an electronic pen are displayed to be distinguished from each other, and this may be reflected when signature authentication is executed.

Also, various embodiments of the present disclosure may generate data for signature recognition, and may execute authentication by using not only previously stored training signature data, but also using various information associated with an environment where a signature is input as signature related information, and thus, the signature recognition rate may increase. For example, the information associated with the environment where a signature is input may be information associated with hover data when a signature is input, a time expended for inputting a signature, a length of a stroke, a time expended for making a stroke, a ratio of width to height of a signature area, an area for each time, an entire area, an average of signature coordinates, a grip state when a signature is input, a signature input means, and the like, but the present disclosure may not be limited thereto.

In various embodiments of the present disclosure as described below, an 'electronic pen' that may be used for inputting a signature may be a device in the shape of a pen, and includes a conductor recognizable by an electronic device. The 'electronic pen' may be embodied to generate an electrical signal by itself, and to enable an electronic device to receive the electrical signal. Alternatively, the 'electronic pen' may be embodied to enable an electronic device to recognize at least a part of the electronic pen without generating an electrical signal. The 'electronic pen' may be embodied in various forms in addition to the form of a pen, and an electronic pen applied to various embodiments of the present disclosure may not be limited to a predetermined form.

Hereinafter, an electronic device according to various embodiments will be described with reference to the accompanying drawings. The term "user" used in various embodiments of the present disclosure may indicate a person who uses an electronic device or a device that uses an electronic device (e.g., an artificial intelligence electronic device).

FIG. 1 illustrates a network environment 100 including an electronic device 101 according to various embodiments of the present disclosure.

Referring to FIG. 1, the electronic device 101 may include at least one of a bus 110, a processor 120, a memory 130, an input/output interface 140, a display 150, a communication interface 160, and a signature processing module 170.

The bus 110 may be a circuit to connect the above-described components with each other and to transfer a communication (e.g., a control message) among the above-described components.

The processor 120, for example, may receive instructions from other components (e.g., the memory 130, the input/output interface 140, the display 150, the communication interface 160, the signature processing module 170, or the like) through the bus 110, analyze the received instructions, and execute calculations or data processing according to the analyzed instructions.

The memory 130 may store instructions or data received from, or generated by, the processor 120 or other components (e.g., the input/output interface 140, the display 150, the communication interface 160, the signature processing module 170, or the like). The memory 130 may include programming modules; for example, a kernel 131, a middleware 132, an application programming interface (API) 133, applications 134, or the like. Each of the aforementioned programming modules may be formed of software, firmware, hardware, or a combination of at least two thereof.

The kernel 131 may control or manage system resources (e.g., the bus 110, the processor 120, the memory 130, or the like) used to execute operations or functions implemented by the remaining other programming modules (e.g., the middleware 132, the API 133, and the applications 134). Furthermore, the kernel 131 may provide an interface through which the middleware 132, the API 133, and the application 134 may access individual components of the electronic device 101 to control or manage them.

The middleware 132 may act as a relay to allow the API 133 or the applications 134 to communicate with the kernel 131 to exchange data. Further, in association with task requests received from the applications 134, the middleware 132 may control (e.g., scheduling or load-balancing) the task requests by using, for example, a method of assigning at least one of the applications 134 a priority for using system resources (e.g., the bus 110, the processor 120, the memory 130, or the like) of the electronic device 101.

The API 133 is an interface through which the applications 134 control functions provided from the kernel 131 or the middleware 132, and may include, for example, at least one interface or function (e.g., instruction) for file control, window control, image processing, text control, or the like.

According to various embodiments of the present disclosure, the applications 134 may include a short message service (SMS)/multimedia messaging service (MMS) application, an email application, a calendar application, an alarm application, a health care application (e.g., application measuring a quantity of exercise or blood sugar) or an environment information application (e.g., application providing information associated with pressure, humidity, temperature, or the like). Additionally or alternately, the application 134 may be an application related to exchanging information between the electronic device 101 and an external electronic device (e.g., an electronic device 104). The application related to exchanging the information may include, for example, a notification relay application for transferring particular information to the external electronic device or a device management application for managing the external electronic device.

For example, the notification relay application may include a function of transferring, to the external electronic device (e.g., the electronic device 104), notification information generated from other applications of the electronic device 101 (e.g., an SMS/MMS application, an e-mail application, a health management application, an environmental information application, and the like). Additionally or alternatively, the notification relay application may receive notification information from, for example, an external electronic device (e.g., the electronic device 104) and provide the same to a user. The device management application, for example, may manage (e.g., install, delete, or update) at least some functions (e.g., turning an external electronic device (or some elements) on or off or adjusting the brightness (or resolution) of a display) of an external electronic device (e.g., the electronic device 104) that communicates with the electronic device 101, applications performed in the external electronic device, or services (e.g., a phone call service, or a messaging service) provided in the external electronic device.

According to various embodiments of the present disclosure, the application 134 may include applications, which are designated according to the property (e.g., a type of electronic device) of the external electronic device (e.g., the electronic device 104). For example, in cases where the external electronic device is an MP3 player, the application 134 may include an application related to the reproduction of music. Similarly, when the external electronic device is a mobile medical device, the applications 134 may include an application related to health care. According to an embodiment of the present disclosure, the application 134 may include at least one of an application designated to the electronic device 101 and an application received from an external electronic device (e.g., the server 106 or the electronic device 104).

The input/output interface 140 may transfer instructions or data, which are input by a user through an input/output device (e.g., a sensor, a keyboard, or a touch screen), to the processor 120, the memory 130, the communication interface 160, or the signature processing module 170 through, for example, the bus 110. For example, the input/output interface 140 may provide, to the processor 120, data for a user's touch, which is input through the touch screen. Further, through the input/output device (e.g., a speaker or a display), the input/output interface 140 may output instructions or data received from the processor 120, the memory 130, the communication interface 160, or the signature processing module 170 through the bus 110. For example, the input/output interface 140 may output voice data processed by the processor 120 to the user through the speaker.

The display 150 may display various pieces of information (e.g., multimedia data, text data, or the like) to the user. Also, the display 150, according to various embodiments of the present disclosure, may display, on a screen in various ways, an input bar or an input pad through which various characters, numbers, symbols or the like are input into the input bar.

The communication interface 160 may connect communication between the electronic device 101 and an external device (e.g., the electronic device 104 or server 106). For example, the communication interface 160 may be connected with a network 162 through wireless communication or wired communication, so as to communicate with the external device. The wireless communication may include at least one of, for example, Wi-Fi, Bluetooth (BT), near field communication (NFC), GPS, and cellular communication (e.g., long term evolution (LTE), LTE-advanced (LTE-A), code division multiple access (CDMA), wideband CDMA (WCDMA), universal mobile telecommunications system (UNITS), wireless broadband (WiBro), global system for mobile communications (GSM) or the like). The wired communication may include at least one of, for example, a universal serial bus (USB), a high definition multimedia interface (HDMI), recommended standard 232 (RS-232), and a plain old telephone service (POTS).

According to an embodiment of the present disclosure, the network 162 may be a communication network. The telecommunication network may include at least one of a computer network, the Internet, Internet of things, and a telephone network. According to an embodiment of the present disclosure, a protocol (e.g., a transport lay protocol, a data link layer protocol, or a physical layer protocol) for communication between the electronic device 101 and an external device may be supported by at least one of the applications 134, the API 133, the middleware 132, the kernel 131, and the communication interface 160.

Although it is illustrated that the electronic device 101 includes the communication interface 160 to communicate with the external electronic device 104, the server 106, or the like through the network 162 in FIG. 1, the electronic device 101 may be embodied to independently operate therein without a separate communication function according to various embodiments of the present disclosure.

According to an embodiment of the present disclosure, the server 106 may support the driving of the electronic device 101 by performing at least one operation (or function) implemented in the electronic device 101. For example, the server 106 may include a signature processing server module 108 (not illustrated) capable of supporting the signature processing module 170 embodied in the electronic device 101. For example, the signature processing server module may include at least one component of the signature processing module 170, and may execute at least one operation out of the operations (or functions) executed by the signature processing module 170 (or may be used as a substitute for the signature processing module 170). For example, when signature data is input in the electronic device 101, the input data may be transmitted to the server 106 through the network 162, and the server 106 may execute authentication with respect to the input signature data through the signature processing server module (not illustrated). The server 106 may transmit an authentication result to the electronic device 101 through the network 162.

The signature processing module 170 may process at least some of the information obtained from other components (e.g., the processor 120, the memory 130, the input/output interface 140, the communication interface 160, or the like), and may provide the processed information to a user in various ways.

For example, according to various embodiments of the present disclosure, when a user input is detected (for example, a user input for activating the electronic device 101 of which a screen is turned off or in a lock state, a user input with respect to an object, or the like), the signature processing module 170 may analyze user signature input data and the execute verification of a signature. That is, the signature processing module 170 may execute an operation for authenticating a user who desires to use the electronic device 101 by authenticating an input handwritten signature. Also, the signature processing module 170 may execute a process to receive, through a signature registration procedure, at least one piece of signature reference data to be used when signature authentication is executed, and to save the same.

According to various embodiments of the present disclosure, a target of signature verification may include an object, an item, or the like. The object or item (or a function item) is displayed, or may be displayed, on a touch screen of the electronic device 101. For example, the object or item indicates at least one of an application, an authentication certification, a menu, a document, a widget, a picture, a video, an e-mail, an SMS message, and an MMS message, and may be generated, selected, executed, deleted, canceled, stored, and changed by a user input means. The object or item may be used as an inclusive meaning including a button, an icon (or a short-cut icon), a thumbnail image, and a folder storing at least one object in an electronic device. Further, the object or item may be displayed in the form of an image, text, and the like. The short-cut icon is an image displayed on the touch screen of the electronic device 101 for use in a rapid execution of each application, or a voice call, an address, a menu and the like which are basically provided in the electronic device 101, and executes a corresponding application when a command or a selection for the execution of the short-cut icon is input.

According to various embodiments of the present disclosure, as described above, any target of which the access to the personal information included in an electronic device needs to be limited may be a target of verification. In this instance, according to an embodiment of the present disclosure, a permissible threshold value used for verifying a handwritten signature may vary based on a target of verification, and a signature recognition standard (e.g., a permissible threshold value) may be dynamically adjusted by taking into consideration at least one condition in an environment where a handwritten input is input.

For example, a handwritten signature may not be input in a regular form each time and the features of the environments where a handwritten signature is input are different. Accordingly, to reduce a degree of error that mistakes a normal handwritten signature as a counterfeit handwritten signature, embodiments of the present disclosure may dynamically adjust a signature recognition standard (e.g., a permissible threshold) by taking into consideration at least one condition in an environment where a handwritten signature is input. Detailed operations executed in the signature processing module 170 will be described in detail.

Although FIG. 1 illustrates the signature processing module 170 as a separate module from the processor 120, at least a part of the signature processing module 170 may be embodied in the processor 120 or the display 150, or the entire functions of the signature processing module 170 may be embodied in the processor 120, another processor, or another module.

Figure 2:
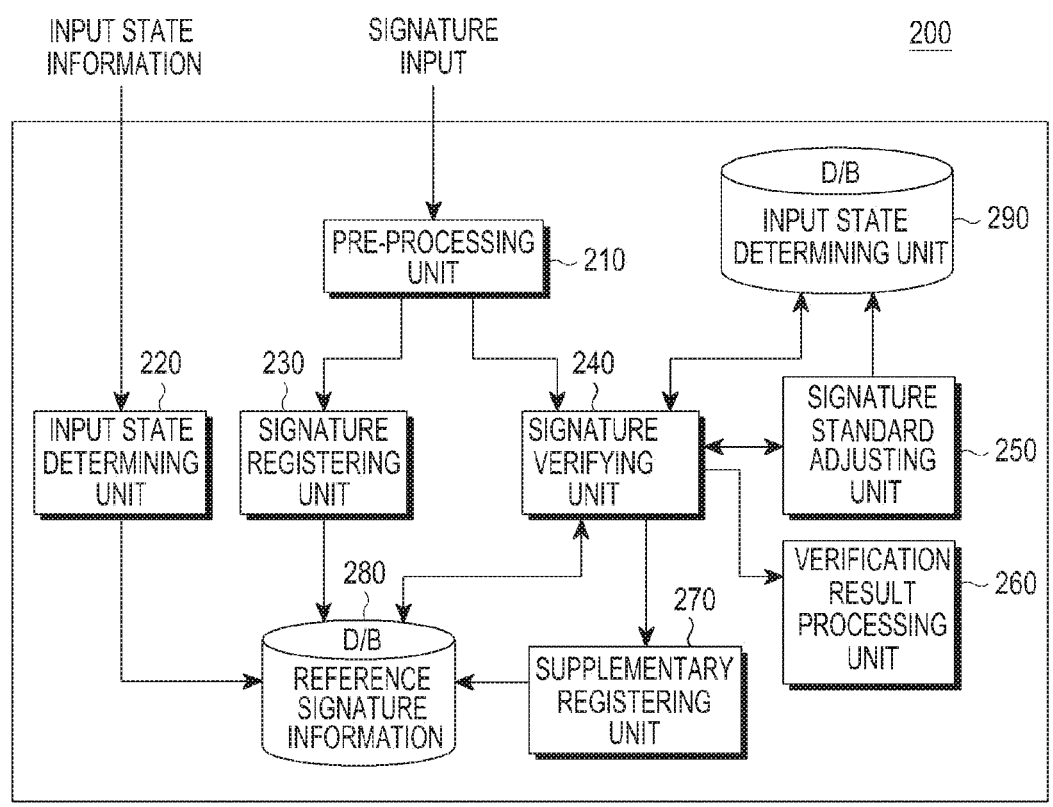
FIG. 2 is a block diagram illustrating a structure of a signature processing module according to various embodiments of the present disclosure.

FIG. 2 illustrates a block diagram of the signature processing module 170 of an electronic device (e.g., the electronic device 101) according to various embodiments of the present disclosure. For ease of description, an example in which the signature processing module 170 is executed in the processor 120 will be described. At least one component included in the handwritten signature processing module 200 of FIG. 2 may be included in the signature processing module 170 or the processor 120 of FIG. 1.

Referring to FIG. 2, a handwritten signature processing device 200, according to an embodiment of the present disclosure, may include a pre-processing unit 210, an input state determining unit 220, a signature registering unit 230, a signature verifying unit 240, a signature standard adjusting unit 250, a verification result processing unit 260, and a supplementary registering unit 270. Also, the handwritten signature processing device 200 may further include a reference signature information database 280, a signature standard information database 290, and the like. Handwritten signature processing may execute an operation for registering a reference signature and an operation of verifying an input signature. The operations may also be executed by the processor 120 of FIG. 1.

The pre-processing unit 210 may execute pre-processing such as rotation, adjusting a size, or the like, when an image associated with a handwritten signature drawn on a touch screen is input. For example, the pre-processing unit 210 may execute a function of normalizing input signature data through the pre-processing process, based on the time expended for inputting a signature, or the size of a signature.

The signature registering unit 230 executes an operation for registering reference signature data, and may store, in the reference signature information database 280, feature values of property information utilized for verification of a handwritten signature. Here, the reference signature information database 280 is a database that stores a digital image of training data input when a user's handwritten signature is registered, and may receive a unique handwritten signature of a corresponding user and may store the trajectory of a handwriting style corresponding to the handwritten signature as reference signature data. Also, the reference signature information database 280 may store at least one piece of input state information (e.g., grip information, input means information, or the like) determined through the input state determining unit 220, together with the input reference signature data.

According to various embodiments of the present disclosure, to authenticate a user, a handwritten signature of each user needs to be registered. Accordingly, the signature registering unit 230 receives a handwritten signature as many times as a predetermined number (e.g., three times) when a handwritten signature is registered, and calculates the distance between the input handwritten signatures.

For example, when the distance between three handwritten signatures is calculated and a signature variation obtained using the distance is smaller than a predetermined reference value, a reference threshold value is determined by applying a first threshold value. When the signature variation is greater than the predetermined reference value, the reference threshold value is determined by applying a second threshold value that is greater than the first threshold value. As described above, when the reference threshold value is determined by estimating the variation of a user's signature, a handwritten signature input for registration and the reference threshold value may be stored together. As described above, by storing a reference threshold value corresponding to a signature variation of each user together with reference signature data, the registration of reference signature data is completed.

After completing the reference signature data as described above, when a user desires to use a secure service or function of the electronic device 101, as handwritten signature data is input with a user input means, the pre-processing unit 210 executes pre-processing with respect to the input handwritten signature data, and the signature verifying unit 240 verifies the handwritten signature data input based on the reference signature data of a user stored in the reference signature information database 280.

The signature verifying unit 240 may calculate a result of comparing input handwritten signature data and reference signature data. To this end, various signature verification algorithms may be applied. For example, a dynamic time warping algorithm may be used. The dynamic time warping algorithm indicates an algorithm that aligns data, compares a plurality of sequences that vary in time, and accepts a result. Also, according to various embodiments of the present disclosure, various other methods may be applied, in addition to the dynamic time warping algorithm.

Also, the signature verifying unit 240 may determine a permissible threshold value by taking into consideration a target of verification, such as a service or function where a user input is generated. Here, the signature verifying unit 250 may execute signature verification based on signature standard information that may be adjustable, according to various embodiments of the present disclosure.

The signature verifying unit 250 may execute adjustment by applying a reference threshold value determined by taking into consideration a variation of a user's signature when signature verification is executed. Also, a permissible threshold value may be set to be different for each type of user input means, in addition to a target of verification and a variation of a user's signature. In other words, based on which of the user input means (from among a finger, a pen, and the like) is used, a permissible threshold value may be set to be different.

For example, when a handwritten signature is input with a pen after a signature handwritten with a pen is registered, an identical type of user input means is used, and thus, a range of adjustment in association with a permissible threshold value may be set to be narrower when compared to the case in which different types of user input means are used. As described above, the permissible threshold value may be different based on whether a user input means used when a handwritten signature is registered and a user input means used when a handwritten signal is input are identical. The events associated with the above may include: a case in which a pen is used when a handwritten signature is registered and a pen is used for inputting a handwritten signature; a case in which a pen is used when a handwritten signature is registered and a finger is used for inputting a handwritten signature; a case in which a finger is used when a handwritten signature is registered and a pen is used for inputting a handwritten signature; and a case in which a finger is used when a handwritten signature is registered and a finger is used for inputting a handwritten signature. In this instance, weights (w1, w2, w3) respectively applied to a handwriting speed, a handwriting pressure, and a handwriting style in associated with a handwritten signature input may be set to be different for each case.

As described above, the signature verifying unit 240 executes the verification of input signature data based on reference signature information stored in the reference signature information database 280 and input state information. According to various embodiments of the present disclosure, verification of signature data may be executed by reflecting signature standard information set in advance in the signature standard information database 290.

Therefore, when signature standard information is determined based on a method to be described below, the signature verifying unit 240 may: compare features between input handwritten signature data and reference signature data stored in the reference signature information database 280; calculate a numeric value (e.g., similarity or the like); and compare the calculated numeric value with the signature standard information so as to verify a handwritten signature.

The verification result processing unit 260 executes an operation associated with the success or failure of the signature verification executed in the signature verifying unit 240. When the signature verification fails, the verification result processing unit 260 executes an operation of outputting a notification message or the like, and when the signature verification is successful, the verification result processing unit 260 may display or execute a target of the verification where a user input is generated.

When a user additionally inputs signature data to use signature recognition after a basic signature registration process, the signature standard adjusting unit 250 may execute a function of adjusting a signature standard based on whether the input data is authenticated. The signature standard information adjusted through the signature standard adjusting unit 250 may be stored in the signature standard information database 290.

When signature data used for signature authentication is input by a user according to an embodiment of the present disclosure, the supplementary registering unit 270 executes a function of additionally registering the input signature data based on whether signature verification is successful, in addition to training signature data registered during a basic signature registering process.

Each functional unit and module in embodiments of the present disclosure may indicate a functional or structural coupling of hardware for executing a technical idea of embodiments of the present disclosure and software for operating the hardware. For example, each functional unit may mean a predetermined code and a logical unit of a hardware resource for performing the predetermined code. However, it will be understood by a person skilled in the technical field of the present disclosure that the each functional unit may not always mean a physically connected code or a single type of hardware.

An electronic device according to any one of the various embodiments of the present disclosure, may include: a storage unit that stores at least one registered handwritten signature as reference signature data; an input unit that receives a handwritten signature that is input; and a controller that executes a process to compare input handwritten signature data and the registered reference signature data when a handwritten signature is input by a user input means, so as to authenticate the input handwritten signature; and to additionally register handwritten signature data associated with the input handwritten signature as reference signature data when a result of the authentication shows that the input handwritten signature is normally authenticated.

According to various embodiments of the present disclosure, the controller may execute a process to determine whether the number of pieces of registered reference signature data exceeds a predetermined number ($N_S$); and to additionally register the normally authenticated handwritten signature data as reference signature data when a result of the determination shows that the number of pieces of registered reference signature data does not exceed the predetermined number ($N_S$).

According to various embodiments of the present disclosure, the controller may execute authentication by further taking into consideration the type of user input means used for the input handwritten signature.

According to various embodiments of the present disclosure, the controller may execute authentication by further taking into consideration the grip state of a user input means used for the input handwritten signature.

According to various embodiments of the present disclosure, the controller may execute a process to determine whether the number of pieces of registered reference signature data exceeds a predetermined number (Nc) when a result of the authentication shows that the input handwritten signature fails normal authentication; and to adjust a signature recognition standard used for authenticating the input handwritten signature when a result of the determination shows that the number of pieces of registered reference signature data does not exceed the predetermined number (Nc).

Figure 3:
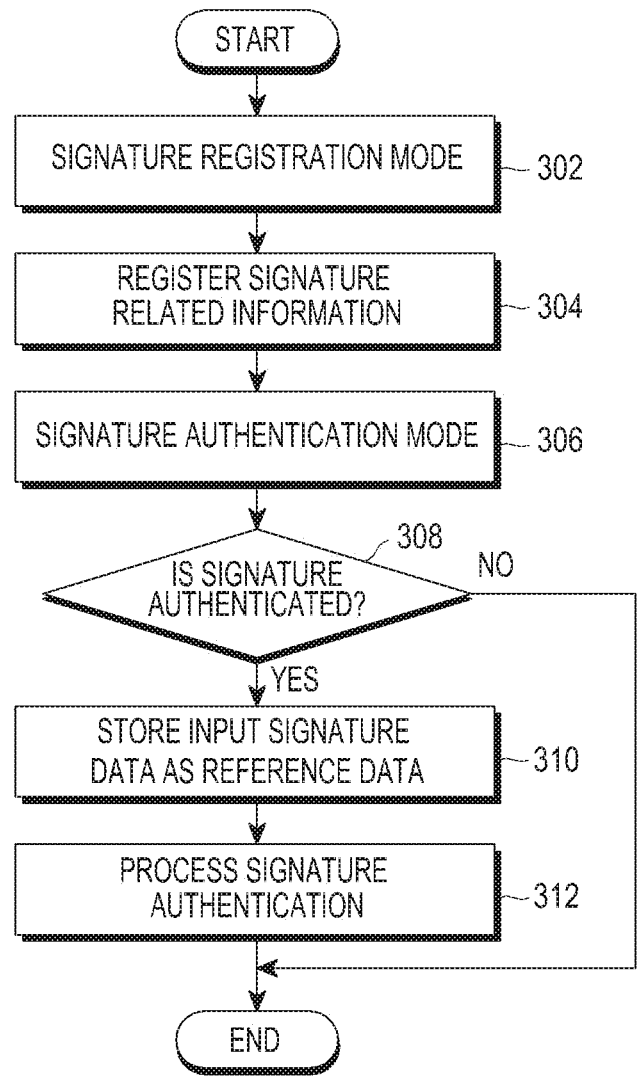
FIG. 3 is a flowchart illustrating a signature registration and authentication procedure according to various embodiments of the present disclosure.

FIG. 3 is a flowchart illustrating a signature registration and authentication procedure according to various embodiments of the present disclosure.

Referring to FIG. 3, in a signature registration mode of operation 302, a signature to be used as reference signature data is input. In operation 304, when the signature is input according to various embodiments of the present disclosure, information associated with inputting the signature may be registered together. For example, the information associated with inputting the signature may include a grip state (e.g., whether a user grips an electronic device or the like) or an input means (e.g., a touch by an electronic pen, a touch by a finger, or the like).

When the signature registration is completed and a signature authentication mode occurs while an electronic device is used in operation 306, signature data for signature authentication needs to be input.

When the input signature is normally authenticated in operation 308, and a normal authentication process with respect to the input signature is completed in operation 312, and according to various embodiments of the present disclosure, the signature data input for signature authentication may be additionally stored as reference signature data in operation 310.

Figure 4:
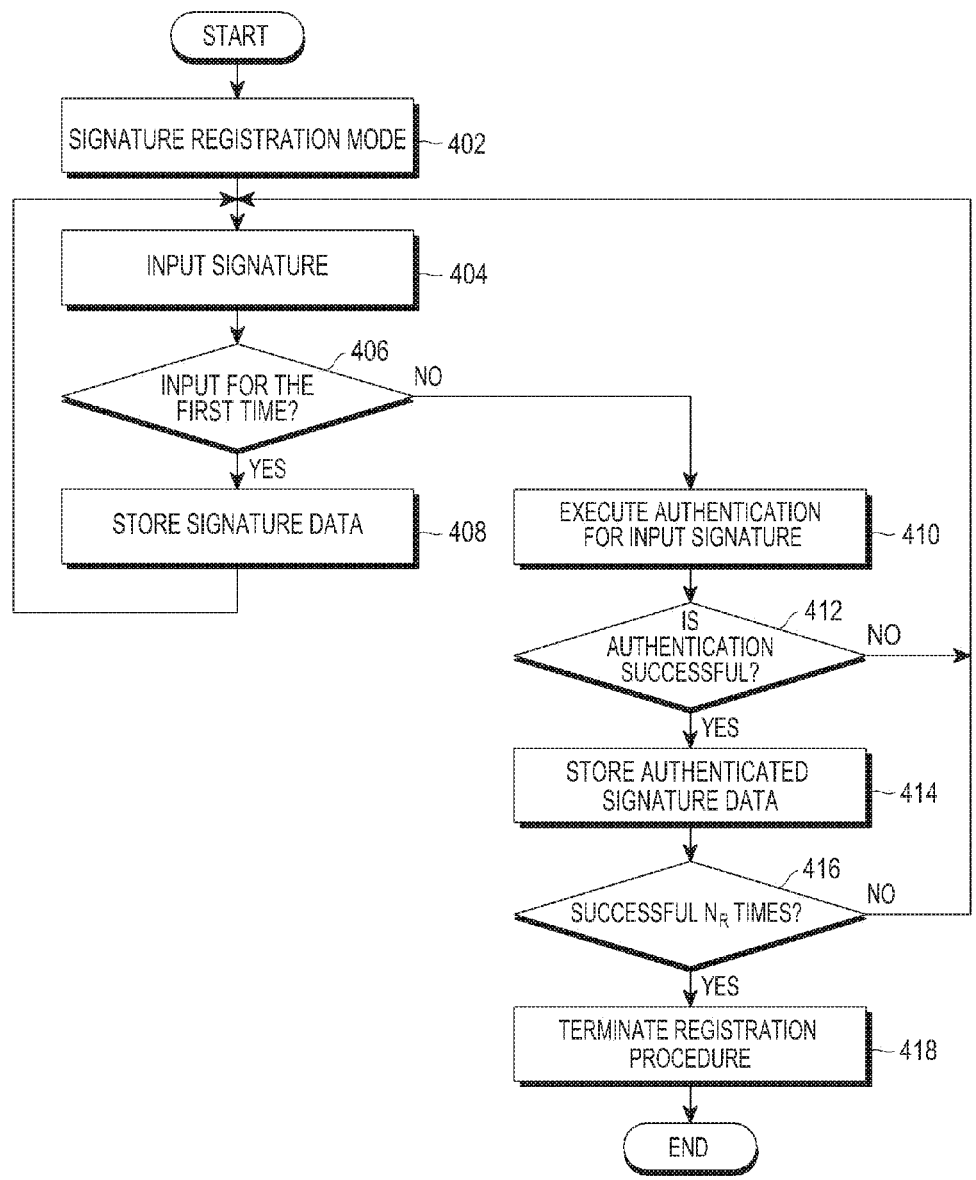
FIG. 4 is a flowchart illustrating a procedure of registering signature reference data according to various embodiments of the present disclosure.

FIG. 4 is a flowchart illustrating a reference signature registration procedure according to various embodiments of the present disclosure.

Referring to FIG. 4, in a signature registration mode of operation 402, when a signature is input by a user input means (e.g., a hand or an electronic pen) in operation 404, it is determined whether the signature is input one time in operation 406. In operation 408, the input signature is stored when the input signature is input for the first time.

Conversely, when the signature is not input for the first time, the input signature is compared with an initially input signature or previous input signatures, and authentication of the input signature is executed in operation 410. The authentication of the input signature may be embodied in various methods, and may be embodied to determine similarity with previously input signature data and to authenticate the input signature when the similarity is greater than or equal to a threshold value. When a result of the authentication shows that the authentication is successful in operation 412, the input signature data is stored in operation 414. In operation 416, when the authentication of the input signature data is successfully completed at least a predetermined number of times ($N_R$) (e.g., three times), the registration procedure is completed in operation 418.

According to a more detailed example, whether handwriting of a user input means begins is determined in a process of registering reference signature data. When it is determined that the user input means begins handwriting, the electronic device 101 activates a handwritten signature mode. For example, the electronic device 101 may detect a user input event, such as a hovering event in which a user input means approaches a touch screen or is located to be close thereto. The electronic device 101 detects a hovering event, and determines whether the user input means begins handwriting.

When the electronic device 101 determines that the user input means begins handwriting, the electronic device 101 activates a handwritten signature mode. Accordingly, the electronic device 101 may recognize a handwriting input of the user input means, and may detect a reference signature input of the user input means.

Subsequently, the electronic device 101 determines whether a reference signature is input as many times as a predetermined number. When a reference signature is not input as many times as the predetermined number, the electronic device 101 requests re-inputting a reference signature, and proceeds with a subsequent operation. Accordingly, when the reference signature is input as many times as the predetermined number, the electronic device 101 executes pre-processing with respect to the reference signature as described above, calculates the distance between reference signatures, and determines a permissible threshold value.

Figure 5:
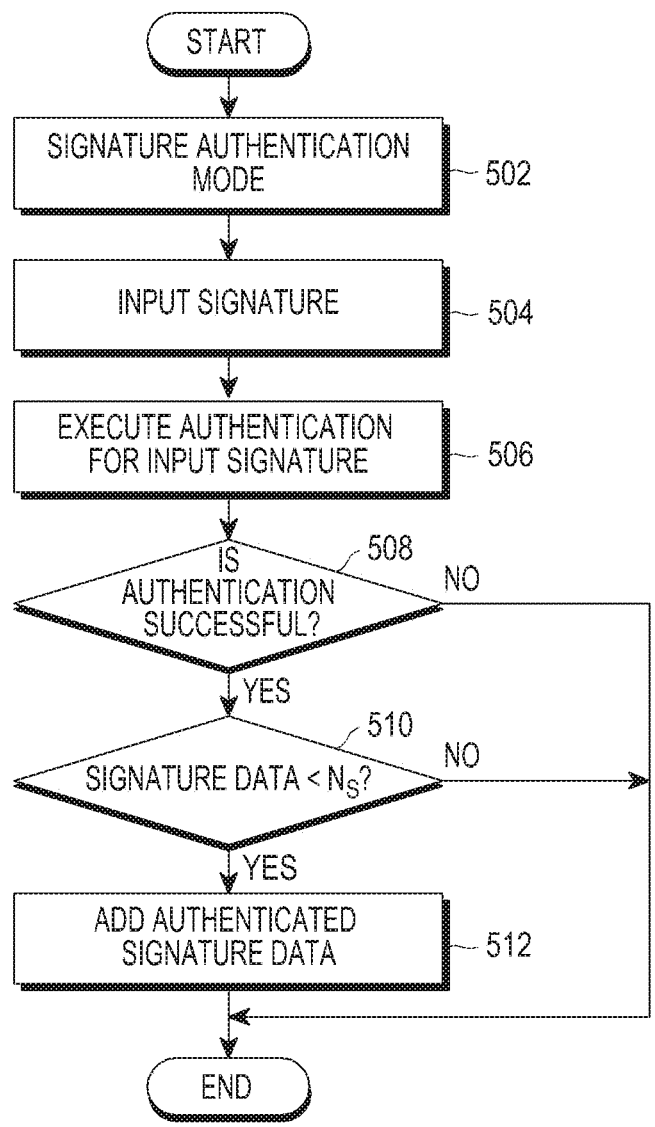
FIG. 5 is a flowchart illustrating a signature authentication procedure according to various embodiments of the present disclosure.

FIG. 5 is a flowchart illustrating a signature authentication procedure according to various embodiments of the present disclosure.

Referring to FIG. 5, in a signature authentication mode of operation 502, when a signature is input in operation 504, the authentication of the input signature is executed in operation 506 by comparing input signature data with previously stored training signature data in operation 508.

When a result of the authentication shows that the authentication is successful in operation 508, it is determined whether the number of pieces of reference signature data stored in advance exceeds a predetermined number (Ns) in operation 510. When a result of the determination shows that the number of pieces of reference signature data does not exceed the predetermined number (Ns), the input signature data may be added to a database as training signature data in operation 512. Subsequently, from the stage of signature authentication, signature authentication may be executed by taking into consideration the additionally stored signature data as reference signature data.

More particularly describing, the electronic device 101 may activate a handwritten signature mode of the electronic device 101 when the handwriting of the user input means begins. For example, the electronic device 101 may activate the handwritten signature mode irrespective of the operation state of the screen of the electronic device. Therefore, the electronic device may activate the handwritten signature mode in a state in which the screen is turned on or off.

Subsequently, the electronic device 101 detects a handwritten signature input of the user input means. Subsequently, the electronic device 101 may calculate a result of comparison between the input handwritten signature data and reference signature data. As detailed examples, authentication of a handwritten signature may be executed by calculating a score by respectively applying weights to a handwriting speed, a handwriting pressure, and a handwriting style associated with a handwritten signature input, based on a reference signature. Also, the authentication may be executed by comparing a previously stored reference signature and an input handwritten signature. For example, the operation of calculating the score may be executed based on a dynamic time warping algorithm that obtains match points between two lines of the reference signature data and the handwritten signature data.

The electronic device 101 compares the calculated score and a permissible threshold value, and when the calculated score is smaller than the permissible threshold value, determines that the input handwritten signature is identical to the registered handwritten signature and determines that the authentication of the signature is successful. Accordingly, the electronic device 101 may output that the input handwritten signature is identical to the reference signature. Conversely, when the calculated score is greater than the permissible threshold value, the electronic device 101 determines that an erroneous handwritten signature is input and displays the failure of a signature.

That is, when new signature data is input by a user, the electronic device 101 determines that the signature data corresponds to the user based on reference signature data stored up to the present. When it is determined that the signature data does not correspond to the user, the electronic device disregards the same, and when it is determined that the signature data corresponds to the user, the electronic device 101 additionally stores the input signature data as reference signature data.

According to various embodiments of the present disclosure, the input signature data may be added up to a predetermined number of pieces of data (e.g., 10 to 12). When the predetermined number of pieces of data is satisfied, signature data even normally authenticated may not be added as reference signature data. Also, the number of pieces of input signature data to be added as reference signature data out of input signature data may be set in advance through simulation. For example, when a result of the simulation executed using 3000 pieces of signature data shows that the best result can be obtained by using 12 pieces of data, a maximum of 12 pieces of reference signature data may be additionally stored as reference signature data.

Therefore, when new handwritten signature data is input, additionally input user data is accumulated based on a predetermined reference value and is utilized for determining whether the signature data corresponds to a user, as described above.

Figure 6:
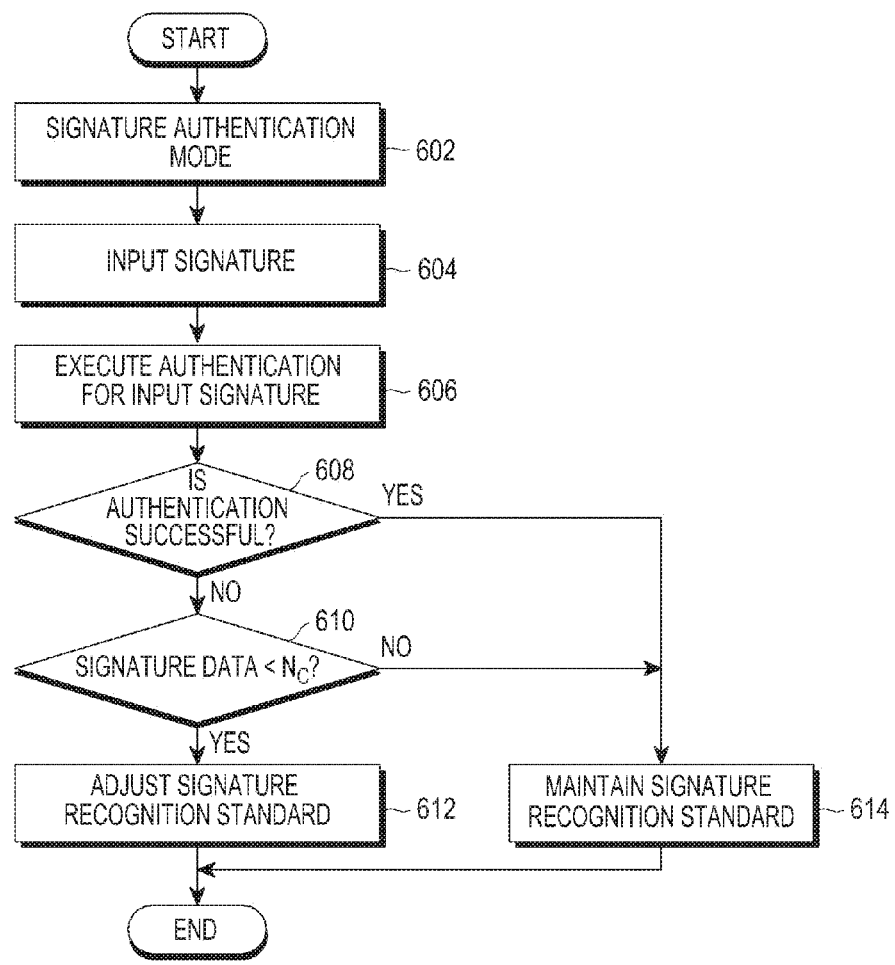
FIG. 6 is a flowchart illustrating a procedure of adjusting a signature recognition standard according to various embodiments of the present disclosure.

FIG. 6 is a flowchart illustrating a procedure of adjusting a signature recognition standard according to various embodiments of the present disclosure.

Referring to FIG. 6, in a signature authentication mode of operation 602, when a signature is input in operation 604, the authentication of the input signature is executed by comparing input signature data with previously stored reference signature data in operation 606.

When a result of the authentication shows that the authentication is successful in operation 608, a set signature recognition standard is maintained as it is in operation 614. Conversely, when the authentication fails and the number of pieces of authenticated signature data does not exceed a predetermined number (Nc) in operation 610, the signature recognition standard may be adjusted in operation 612 according to various embodiments of the present disclosure.

As a detailed example of a process of adjusting the signature recognition standard, when user's signature data is additionally input through the process, the process is implemented to continuously recognize the accuracy of the input signature data, and to decrease a signature data authentication standard of a corresponding user when signature data exists, of which authentication is abnormally executed.

For example, when authentication error occurs in at least one piece of signature data out of signature data (nine pieces of additional signature data) that are additionally input through the signature recognition after three basic signature registration processes, a corresponding user is distinguished as a user whose signature accuracy is low. Otherwise, the user is distinguished as a user whose signature accuracy is high.

According to various embodiments of the present disclosure, the process of lowering the signature recognition standard determines that the corresponding user irregularly inputs a signature and sets a reference point used for comparison in the signature recognition to be lower than a normal value. This may include a case of adjusting a data reference value applied to satisfy 95% of the user authentication to a value to satisfy 96%. This may be used as a method of increasing a signature recognition rate of a user, by adjusting a signature recognition standard of a signature resistant based on the accuracy of a signatory distinguished through the signature recognition standard adjusting process.

Also, according to various embodiments of the present disclosure, a user who experiences an authentication error at least one time while a signature is input 12 times, may be determined as a signatory whose signature accuracy is low and a signature recognition standard of the corresponding user may be lowered. For example, the standard condition may be lowered so as to satisfy the succeed rate of a signatory of 96%.

By adjusting the signature recognition standard, the success rate of a signature may be increased and the success rates of others may be decreased.

Conversely, a user who successfully executes inputting a signature twelve times is determined as a signatory whose signature accuracy is high, and a signature recognition standard is maintained as is or increased. Therefore, the condition is maintained so that the success rate of the signature recognition of the signatory satisfies 95%.

At least one operation may be omitted from the operations of FIGS. 3 to 6 or at least one different operation may be added to the operations. In addition, the operations of FIGS. 3 to 6 may be processed in order of the flowchart, or an order of at least one operation may be changed with an order of another operation.

A method for an electronic device to process a signature input according to any one of various embodiments of the present disclosure may include: registering, as reference signature data, at least one handwritten signature input by a user input means in the electronic device; when a handwritten signature is input by the user input means, comparing the input handwritten signature data and the registered reference signature data so as to authenticate the input handwritten signature; and when a result of the authentication shows that the input handwritten signature is normally authenticated, additionally registering handwritten signature data associated with the input handwritten signature as reference signature data.

According to various embodiments of the present disclosure, the method further includes: determining whether the number of pieces of registered reference signature data exceeds a predetermined number ($N_s$), wherein a result of the determination shows that the number of pieces of registered reference signature data does not exceed the number ($N_s$), the normally authenticated handwritten signature data is additionally registered as reference signature data.

According to various embodiments of the present disclosure, the operation of authenticating the input handwritten signature includes: authenticating the input handwritten signature by further taking into consideration the type of user input means used for the input handwritten signature.

According to various embodiments of the present disclosure, the operation of authenticating the input handwritten signature includes: authenticating the input handwritten signature by further taking into consideration the grip state of a user input means used for the input handwritten signature.

According to various embodiments of the present disclosure, the method further includes: when a result of the authentication shows that the input handwritten signature fails a normal authentication, the number of pieces of registered reference signature data exceeds a predetermined number ($N_C$); and when a result of the determination shows that the number of pieces of registered reference signature data does not exceed the predetermined number ($N_C$), adjusting a signature recognition standard for authenticating the input handwritten signature.

Figure 7:
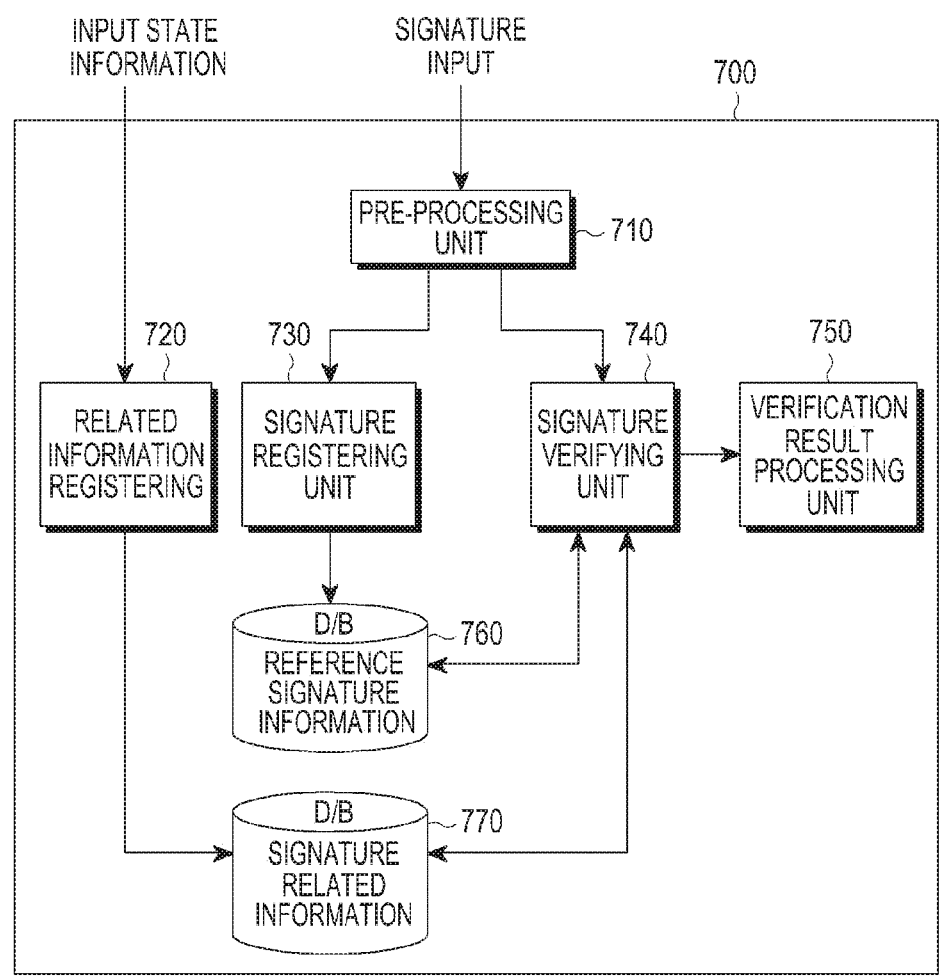
FIG. 7 is a block diagram illustrating a structure of a signature processing module according to various embodiments of the present disclosure.

FIG. 7 is a block diagram illustrating a handwritten signature processing module according to various embodiments of the present disclosure.

Referring to FIG. 7, a handwritten signature processing module 700, according to an embodiment of the present disclosure, may include at least one of a pre-processing unit 710, a related information registering unit 720, a signature registering unit 730, a signature verifying unit 740, and a verification result processing unit 750. Also, the handwritten signature processing device 700 may further include a reference signature information database 760, a signature related information database 770, and the like. Handwritten signature processing may execute an operation for registering a reference signature and an operation of verifying an input signature. The operations may also be executed by the signature processing module 170 or the processor 120 of FIG. 1.

The pre-processing unit 710 may execute pre-processing such as rotation, adjusting a size, or the like, when an image is input, which is associated with a handwritten signature drawn on a touch screen. For example, the pre-processing unit 210 may execute a function of normalizing input signature data based on the time expended for inputting a signature, or the size of a signature, through the pre-processing process.

The signature registering unit 730 executes an operation of registering reference signature data, and may store, in the information database 760, feature values of property information utilized for verification of a handwritten signature. Here, the reference signature information database 760 is a database that stores a digital image of training data input when a user's handwritten signature is registered, and may receive a unique handwritten signature of a corresponding user and may store the trajectory of a handwriting style corresponding to the handwritten signature as reference signature data.

The related information registering unit 720 determines at least one piece of information associated with inputting of the signature when signature data is input, and register the information in the signature related information database 770.

In this instance, examples of the signature related information associated with inputting the signature may include at least one piece of information from among hover data when a signature is input, a time expended for inputting a signature, a length of a stroke, a time expended for making a stroke, a rate of width to length of a signature area, an area of each stroke for each time, an area of the entire input signature data, an average of signature coordinates, a grip state of when a signature is input, a signature inputting means, and the like, but the present disclosure may not be limited thereto.

Particularly, as described above, to authenticate a user, reference signature data associated with each user needs to be registered in the reference signature information database 760. Accordingly, the signature registering unit 730 receives, as reference signature data, handwritten signature data as many times as a predetermined number when a handwritten signature is registered, and calculates, for example, a distance between input handwritten signatures so as to determine whether to use the same as reference signature data.

For example, when a distance is calculated between three handwritten signatures and a signature variation using the calculated distance is smaller than a predetermined reference value, a reference threshold value is determined by applying a first threshold value. When the signature variation is greater than the predetermined reference value, the reference threshold value is determined by applying a second threshold value greater than the first threshold value. As described above, when the reference threshold value is determined by estimating the variation of a user's signature, a handwritten signature input for registration and the reference threshold may be stored together. As described above, by storing a reference threshold value corresponding to a signature variation of each user together with a reference handwritten signature for each user, the registration of the reference handwritten signature is completed.

According to various embodiments of the present disclosure, at least one piece of related information, which is related to inputting a handwritten signature, may be stored in the signature related information database 770, in correspondence to each piece of handwritten signature data (e.g., training handwritten data) input when the handwritten signature is registered. Therefore, the inputted reference signature data and at least one piece of signature related information may be mapped and stored.

After the registration of the reference signature data and the signature related information are completed, when a user desires to use a secure service or function of the electronic device 101, the pre-processing unit 710 may execute pre-processing so as to authenticate a handwritten signature input when the handwritten signature is input using a user input means. The signature verifying unit 740 verifies whether input handwritten signature data is authenticated based on at least one piece of reference signature data of a corresponding user which is stored in the reference signature information database 760. Also, according to various embodiments of the present disclosure, the signature verifying unit 740 uses at least one piece of signature related information stored in the signature related information database 770, for the verification of a signature.

The signature verifying unit 740 calculates a result of comparison between input handwritten signature data and reference signature data stored in advance, so as to determine whether a signature is authenticated. For example, a dynamic time warping algorithm may be used to determine whether the signature is authenticated. The dynamic time warping algorithm indicates an algorithm that aligns data, compares a plurality of sequences that vary in time, and accepts a result.

Also, the signature verifying unit 740 may determine a permissible threshold value by taking into consideration a target of verification, such as a service or function where a user input is generated. For example, the signature verifying unit 740 may execute adjustment by applying a reference threshold value determined by taking into consideration a variation of a user's signature when signature verification is executed. Also, the permissible threshold value may be set to be different based on at least one piece of signature related information stored in the signature related information database 770, in addition to the target of verification and the variation of the signature of the user. For example, as described above, by comparing at least one piece of information from among hover data when a signature is input, a time expended for inputting a signature, a length of a stroke, a time expended for making a stroke, a rate of width to length of a signature area, an area of each stroke for each time, an area of the entire input signature data, an average of signature coordinates, a grip state when a signature is input, a signature inputting means, and the like, the accuracy of verification of a signature may be increased.

As described above, the signature verifying unit 740 may verify input signature data with reference to reference signature information stored in the reference signature information database 760 and signature related information stored in the signature related information database 770.

The verification result processing unit 750 executes an operation associated with the success or failure of the signature verification executed in the signature verifying unit 740. When the signature verification fails, the verification result processing unit 750 executes an operation of outputting a notification message or the like, and when the signature verification is successful, the verification result processing unit 750 may display or execute a target of the verification where a user input is generated.

Each functional unit and module in embodiments of the present disclosure may indicate a functional or structural coupling of hardware for executing a technical idea of embodiments of the present disclosure and software for operating the hardware. For example, each functional unit may mean a predetermined code and a unit of logic of a hardware resource for performing the predetermined code. However, it will be understood by a person skilled in the technical field of the present disclosure that each functional unit does not mean the physically edited codes or a kind of hardware.

An electronic device, according to any one of various embodiments of the present disclosure, may include: a storage unit that stores at least one registered handwritten signature as reference signature data; an input unit that receives a handwritten signature that is input; and a controller that executes a process to compare input handwritten signature data and the registered handwritten signature data when a handwritten signature is input by a user input means, so as to authenticate the input handwritten signature, wherein the authentication is executed by further taking into consideration at least one piece of registered signature related information.

According to various embodiments of the present disclosure, the controller executes authentication by further taking into consideration the type of a user input means used for the input handwritten signature.

According to various embodiments of the present disclosure, the controller executes authentication by further taking into consideration whether the type of a user input means when a handwritten signature is registered and the type of a user input means when a handwritten signature is authenticated are identical to each other.

According to various embodiments of the present disclosure, the controller executes authentication by further taking into consideration the grip state of a user input means used for the input handwritten signature.

According to various embodiments of the present disclosure, the signature related information is one or more information selected from among hover data when a signature is input, a time expended for inputting a signature, a length of a stroke, a time expended for making a stroke, a ratio of width to height of a signature area, an area for each time, an entire area of an input signature, an average of signature coordinates, a grip state when a signature is written, and a signature input means.

Figure 8:
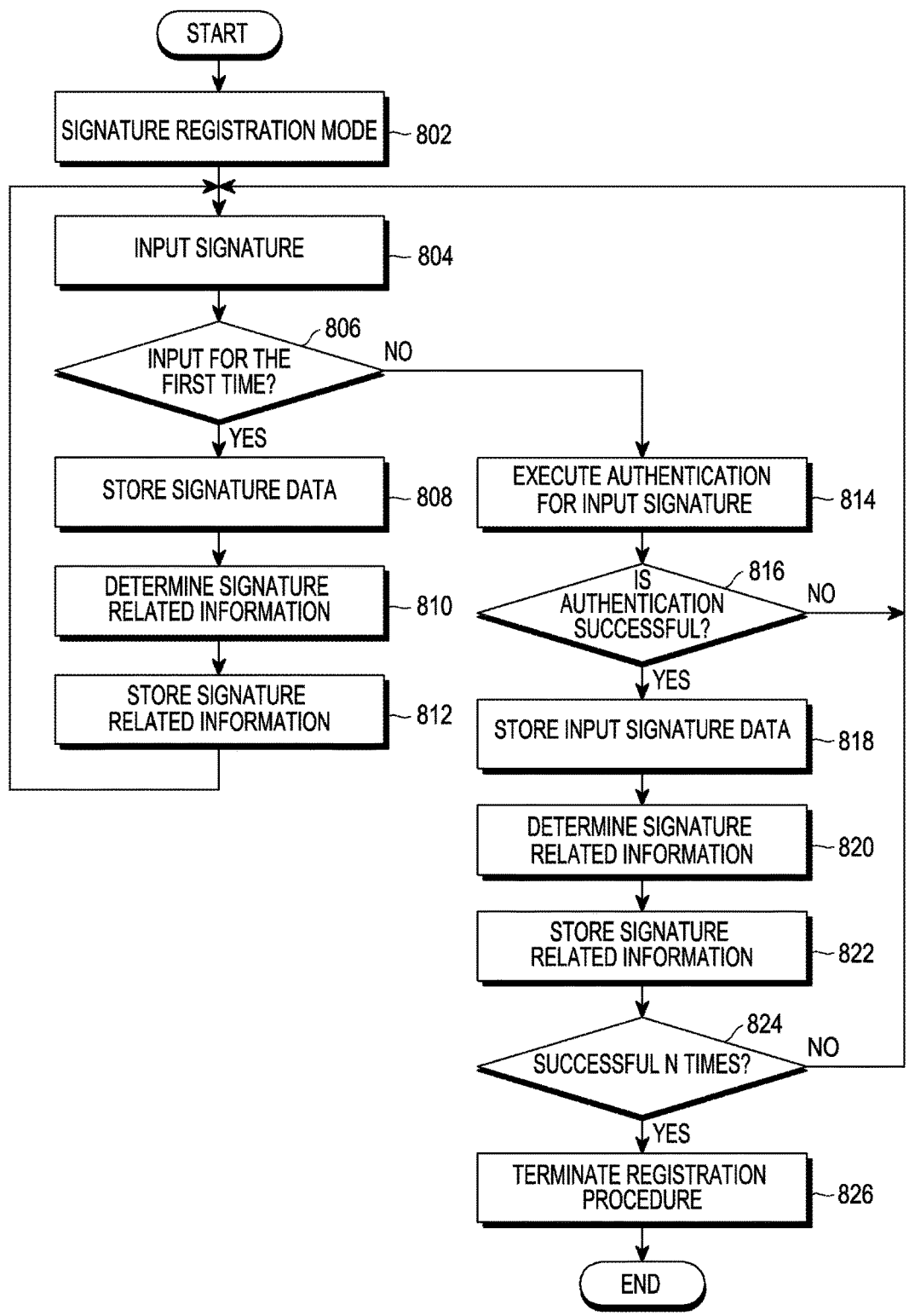
FIG. 8 is a flowchart illustrating a signature registration procedure according to various embodiments of the present disclosure.

FIG. 8 is a flowchart illustrating a procedure of registering reference signature data according to various embodiments of the present disclosure.

Referring to FIG. 8, in a signature registration mode of operation 802, when a signature is input by a user input means (e.g., a hand or an electronic pen) in operation 804, it is determined whether the signature is input one time in operation 806. When the signature is input for the first time, the input signature is stored in operation 808. According to various embodiments of the present disclosure, signature related information, which is associated with the signature input during registration, is determined in operation 810. The determined signature related information is stored in a database in operation 812.

When it is determined that the signature is not input for the first time in operation 806, the authentication of the input signature is executed by comparing the input signature with an initially input signature data or previously input signature data in operation 814. The authentication of the input signature may be embodied in various methods, and may be embodied to determine similarity with previously input signature data and to authenticate the input signature when the similarity is greater than, or equal to, a threshold value. When a result of the authentication shows that the authentication is successful in operation 816, the input signature data is stored in operation 818. Also, according to various embodiments of the present disclosure, signature related information, which is stored during registration of a signature, is determined in operation 820. The determined signature related information is stored in a database in operation 822.

In operation 824, when the authentication of the input signature is successfully completed at least a predetermined number (NR) of times (e.g., three to ten times), the registration procedure is completed in operation 826.

According to various embodiments of the present disclosure, whether handwriting of a user input means begins is determined in a process of registering reference signature data. When it is determined that the user input means begins handwriting, the electronic device 101 activates a handwritten signature mode. For example, the electronic device 101 may detect a user input event, such as a hovering event in which a user input means approaches a touch screen or is located to be close thereto. The electronic device 101 detects a hovering event, and determines whether the user input means begins handwriting.

When the electronic device 101 determines that the user input means begins handwriting, the electronic device 101 activates a handwritten signature mode. Accordingly, the electronic device 101 may recognize a handwritten input of the user input means, and may detect reference signature data input by the user input means.

According to various embodiments of the present disclosure, the electronic device 101 may determine whether reference signature data is input as many times as a predetermined number. When reference signature data is not input as many times as the predetermined number, the electronic device 101 requests re-inputting reference signature data, and proceeds with a subsequent operation. When the reference signature data is input as many times as the predetermined number, the electronic device 101 executes pre-processing with respect to the reference signature data as described above, calculates a distance between reference signature data, and determines a permissible threshold value.

Figure 9:
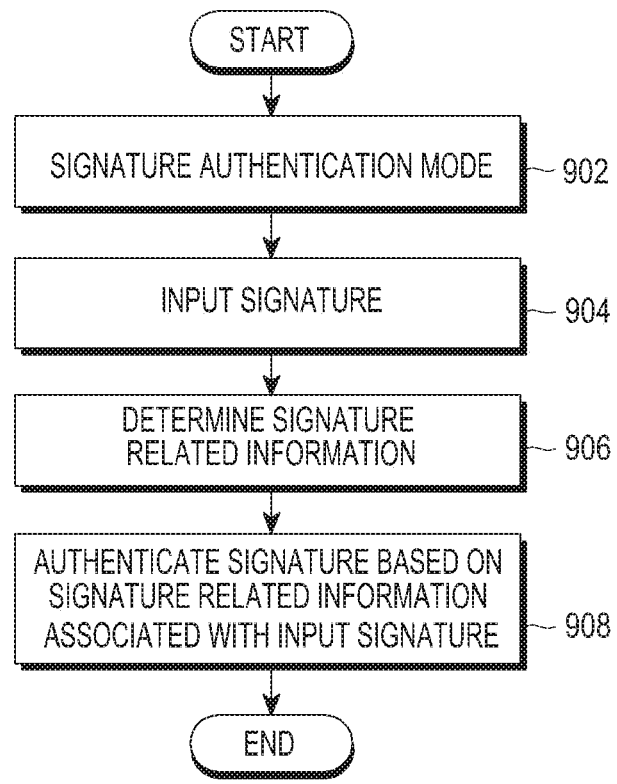
FIG. 9 is a flowchart illustrating a signature authentication procedure according to various embodiments of the present disclosure.

FIG. 9 is a flowchart illustrating a signature authentication procedure according to various embodiments of the present disclosure.

Referring to FIG. 9, in a signature authentication mode of operation 902, when a signature is input in operation 904, signature related information is determined in operation 906. Authentication is executed by comparing input signature data and signature related information, with the reference signature data and signature related information corresponding thereto, which are stored in advance, in operation 908.

More particularly describing, the electronic device 101 may activate a handwritten signature mode of the electronic device 101 when the handwriting of the user input means begins. For example, the electronic device 101 may activate the handwritten signature mode irrespective of an operation state of the screen of the electronic device. For example, the electronic device may activate the handwritten signature mode in a state in which the screen is turned on or off.

Subsequently, the electronic device 101 detects a handwritten signature input of the user input means. Subsequently, the electronic device 101 may calculate a result of comparison between the input handwritten signature data and the reference signature data. As a detailed example, authentication of a handwritten signature may be executed by calculating a score through respectively applying each weight to at least one piece of signature related information, based on a reference signature. Also, the authentication may be executed by comparing a previously stored reference signature data and input handwritten signature data. For example, the operation of calculating the score may be executed based on a dynamic time warping algorithm that obtains match points between two lines of a reference signature and a handwritten signature.

Therefore, the electronic device 101 compares the calculated store and a permissible threshold value, and when the calculated score is smaller than the permissible threshold value, determines that the input handwritten signature is identical to the registered handwritten signature and determines that the authentication of the signature is successful. Accordingly, the electronic device 101 may output that the input handwritten signature is identical to the reference signature. Conversely, when the calculated score is greater than the permissible threshold value, the electronic device 101 determines that a counterfeit handwritten signature is input and displays the failure of a signature.

Accordingly, more efficient and accurate handwritten signature authentication may be provided that executes authentication with various pieces of signature related information when new handwritten signature data is input.

Signature related information that may be applied for the authentication of a signature, according to various embodiments of the present disclosure, may include at least one piece of information from among information as follows:

hover information: Use hover data by recognizing the hover data as a line, and recognize hover data as a line and compare a change in direction.

entire time: the time from a signature starting point to a signature ending point.

length of stroke: The length of a line actually written when a signature is input.

time of stroke: the time actually expended for inputting a signature.

signature ratio: the ratio of width to height of a signature area.

area for each time: signature area for each time.

entire area: area where a signature occupies.

Y coordinate: average Y coordinate of signature coordinates.

X coordinate: average X coordinate of signature coordinates.

distinguishing grip state: a grip state or a non grip state.

distinguishing input means: a hand or an electronic pen (e.g., S-PEN).

For example, when the signature related information is reflected to the authentication of a signature, the signature recognition rate of a user may obtain a comparison result as follows:

1. When only a signature recognition comparison routine of the related art is used:
signature recognition rate of a user: 95%
signature recognition rate of others: 12.26%

2. When detailed recognition comparison routine is used by reflecting signature related information to signature authentication according to various embodiments of the present disclosure:

2-1. When hover is applied:
signature recognition rate of a user: 95%
signature recognition rate of others: 9.98%

2-2. When an entire time, the time expended for making a stroke, and the size of an area for each time are applied:
signature recognition rate of a user: 95%
signature recognition rate of others: 5.02%

As shown from the data, in the case in which the standard for the user's signature recognition rate is determined to be 95%, the signature recognition rate of others is 9.98% when a hover is applied and the signature recognition rate of others is 5.02% when time information is used, which are lower than the recognition rate of 12.26% according to the related art. According to various embodiments of the present disclosure, this indicates that the signature recognition rate of a user may be increased and the recognition rate of others becomes lowered.

A method for an electronic device to process a signature input, according to any one of various embodiments of the present disclosure may include: registering, as reference signature data, at least one handwritten signature input by a user input means in the electronic device; when the handwritten signature is registered, registering at least one signature related information, which is related to the handwritten signature; and when a handwritten signature is input for signature authentication, comparing input handwritten signature data and the registered handwritten signature data, so as to authenticate the input handwritten signature, wherein the authentication is executed by further taking into consideration at least one registered signature related information.

According to various embodiments of the present disclosure, the operation of authenticating the input handwritten signature is executed by further taking into consideration the type of a user input means used for the input handwritten signature.

According to various embodiments of the present disclosure, the authentication executed by further taking into consideration the type of a user input means, includes: executing authentication by taking into consideration whether the type of a user input means used when a handwritten signature is registered and the type of a user input means used when a handwritten signature is authenticated are identical to each other.

According to various embodiments of the present disclosure, the operation of authenticating the input handwritten signature is executed by further taking into consideration the grip state of a user input means used for the input handwritten signature.

According to various embodiments of the present disclosure, the signature related information is one or more information selected from among hover data when a signature is input, a time expended for inputting a signature, a length of a stroke, a time expended for making a stroke, a ratio of width to height of a signature area, an area for each time, an entire area of an input signature, an average of signature coordinates, a grip state when a signature is written, and a signature input means.

FIGS. 10A to 10C are diagrams illustrating an example in which embodiments of the present disclosure are implemented in a screen of an electronic device.

When a signature 1010 is selected as a means for unlocking a screen in a lock-screen setting screen of an electronic device 1000, as illustrated in FIG. 10A, a signature of a user may be registered as illustrated in FIG. 10B. Referring to FIG. 10B, a signature 1030 is input into a signature input bar 1020 in an unlock-with-signature setting screen.

For example, when an initially registered signature and a subsequently registered signature are not identical as illustrated in FIG. 10B, re-inputting a signature 1040 is requested as illustrated in FIG. 10C and signature reference data is registered as many times as a predetermined number of times in a signature registration process. As described above, training signature data may be repeatedly registered as many times as a predetermined number of times (e.g., three times).

Figure 11:
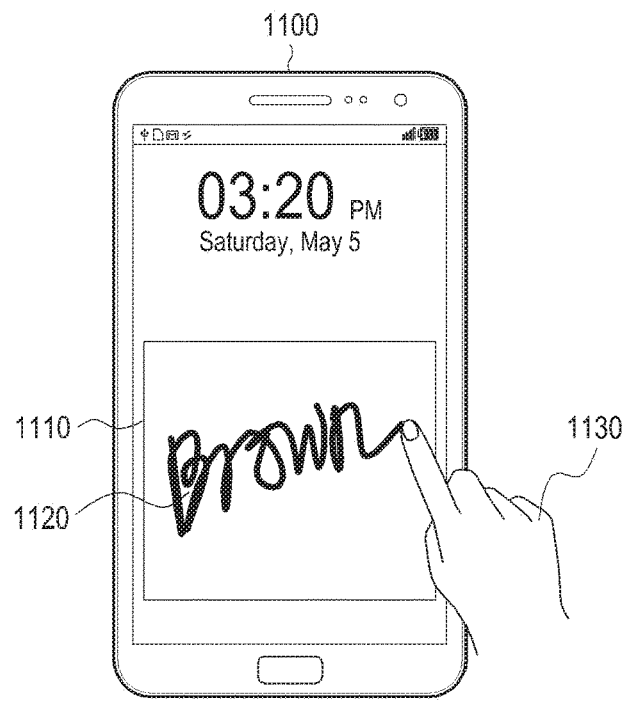
FIG. 11 is a diagram illustrating an example of a signature input screen of an electronic device to which a signature is input by a hand according to various embodiments of the present disclosure.
Figure 12:
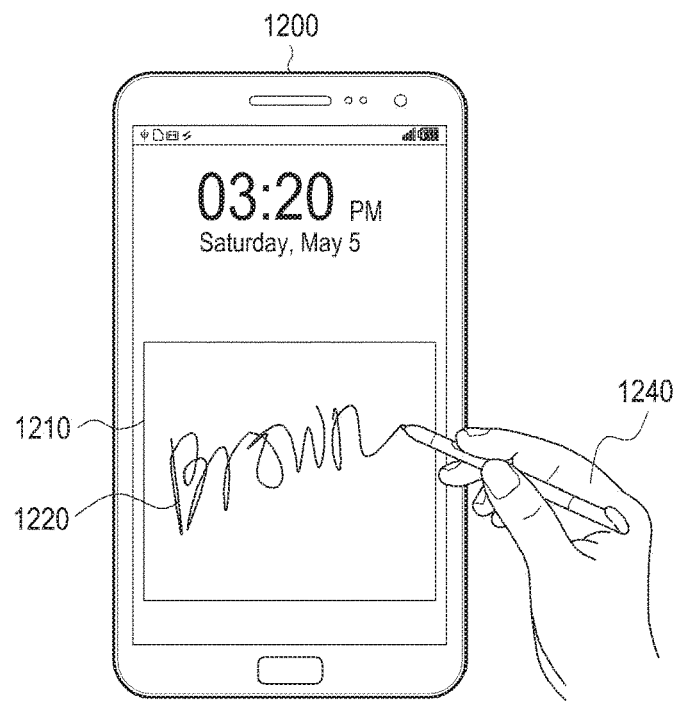
FIG. 12 is a diagram illustrating an example of a signature input screen of an electronic device to which a signature is input by an electronic pen according to various embodiments of the present disclosure.

FIGS. 11 and 12 illustrate examples of unlocking a lock screen by inputting a signature according to various embodiments of the present disclosure.

Referring to FIGS. 11 and 12, signature authentication may be executed by inputting a signature in a lock screen, and comparing input signature data with at least one piece of reference signature data stored in a signature registration process.

FIG. 11 illustrates an example in which a signature 1120 is input with a hand 1130 through a signature input bar 1110 in a lock screen of an electronic device 1100. FIG. 12 illustrates an example in which a signature 1220 is input with an electronic pen 1240 through a signature input bar 1210 in a lock screen of an electronic device 1200.

As described above, reliability of authentication may be increased by further taking into consideration signature related information (e.g., a signature input with a hand or a signature input with an electronic pen), in addition to the signature data input through the signature input bar.

Figure 13A:
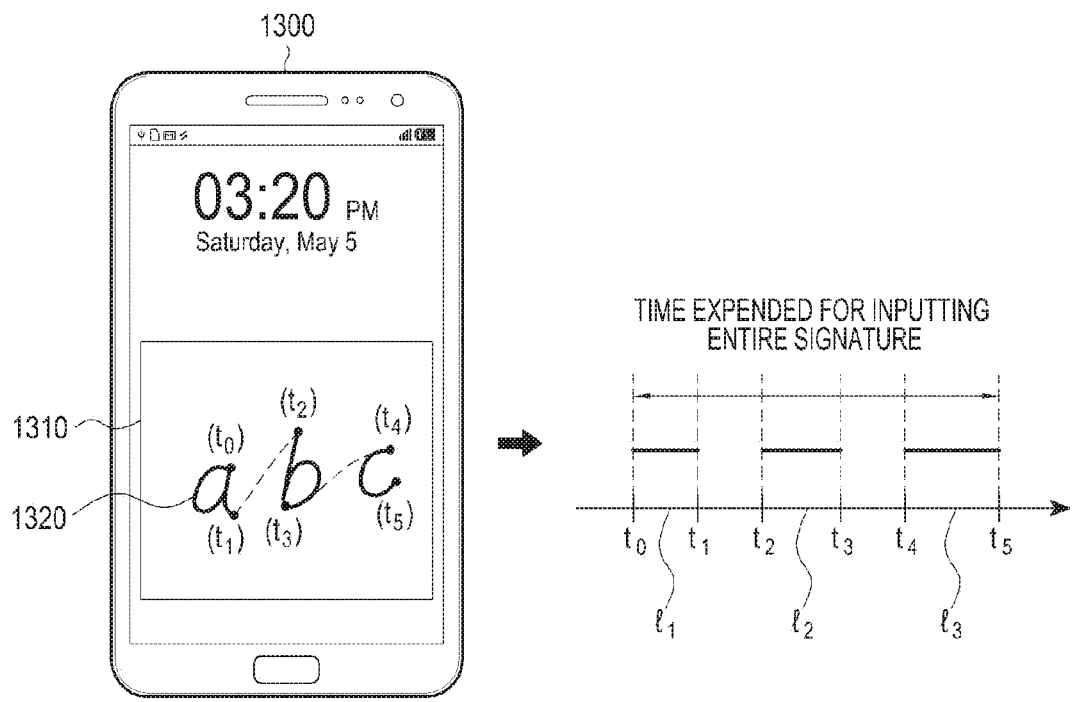
FIGS. 13A and 13B are diagrams illustrating an example of determining signature related information according to various embodiments of the present disclosure.
Figure 13B:
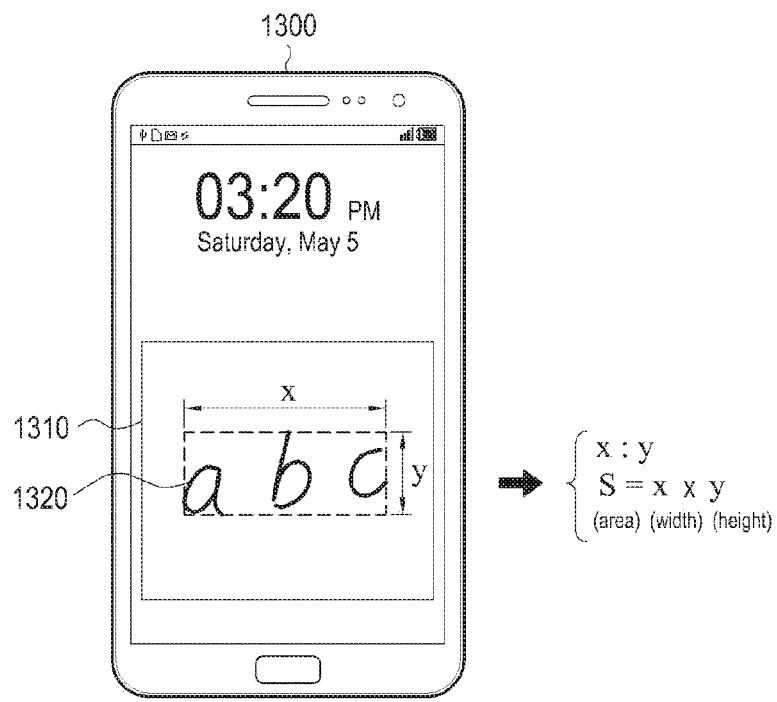

FIGS. 13A and 13B are diagrams illustrating an example of determining signature related information according to various embodiments of the present disclosure.

Referring to FIG. 13A, when a signature 1320 is input in a signature input bar 1310 of an electronic device 1300, signature authentication may be executed by comparing input signature data and reference signature data stored in advance.

According to various embodiments of the present disclosure, as described above, by further applying at least one piece of signature related information to signature authentication, the reliability of the signature authentication may be increased.

For example, as illustrated in FIG. 13A, signature authentication may be executed by further taking into consideration a time (e.g., $t_1-t_0$, $t_3-t_2$, $t_5-t_4$) of each stroke (e.g., stroke 'a,' stroke 'b,' and stroke 'c') of input signature data, as signature related data.

Also, as illustrated in FIG. 13A, signature authentication may be executed by further taking into consideration hover data between strokes marked by a broken line, as signature related data. Also, according to various embodiments of the present disclosure, signature authentication may be executed by further taking into consideration a time expended for inputting an entire signature as signature related data.

With reference to FIG. 13B, signature authentication may be executed by further taking into consideration a ratio of width to height of input signature data, an area of the input signature data, and the like, as signature related data.

Figure 14:
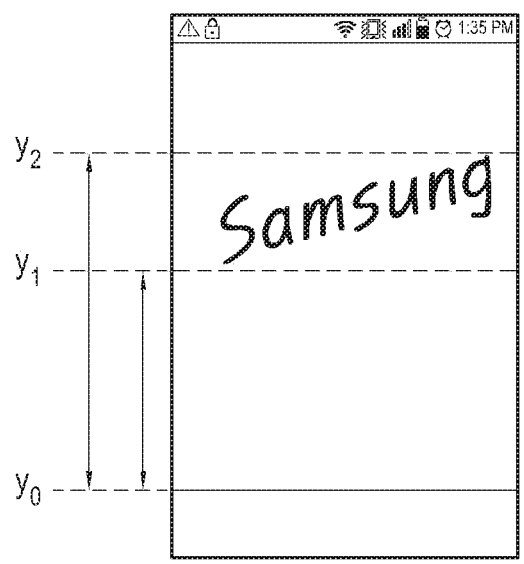
FIG. 14 is a diagram illustrating an example of determining signature location information as signature related information according to various embodiments of the present disclosure.

FIG. 14 is a diagram illustrating an example of determining signature location information as signature related information according to various embodiments of the present disclosure.

Referring to FIG. 14, a Y coordinate of a signature input when signature related information is registered in a signature registration mode, may be calculated and may be registered as signature related information. Accordingly, signature authentication may be more accurately executed by comparing a Y coordinate value of the signature input when the signature is authenticated and a Y coordinate value registered as signature related information when signature information is registered.

At least one piece of signature related information out of various types of signature related information may be used for signature authentication. When a plurality of pieces of signature related information are applied to the authentication of a signature according to various embodiments of the present disclosure, a signature recognition rate of a user may be increased and a signature recognition rate of others may be decreased by applying a weight to each piece of signature related information.

For example, a relatively high weight may be applied to a direction change graph of input signature data, and a relatively low weight may be applied to other signature related information (e.g., hover data when a signature is input, a time expended for inputting a signature, a length of a stroke, a time expended for making a stroke, a ratio of width to height of a signature area, an area for each time, an entire area, an average of signature coordinates, a grip state when a signature is input, a signature input means, and the like).

Figure 15:
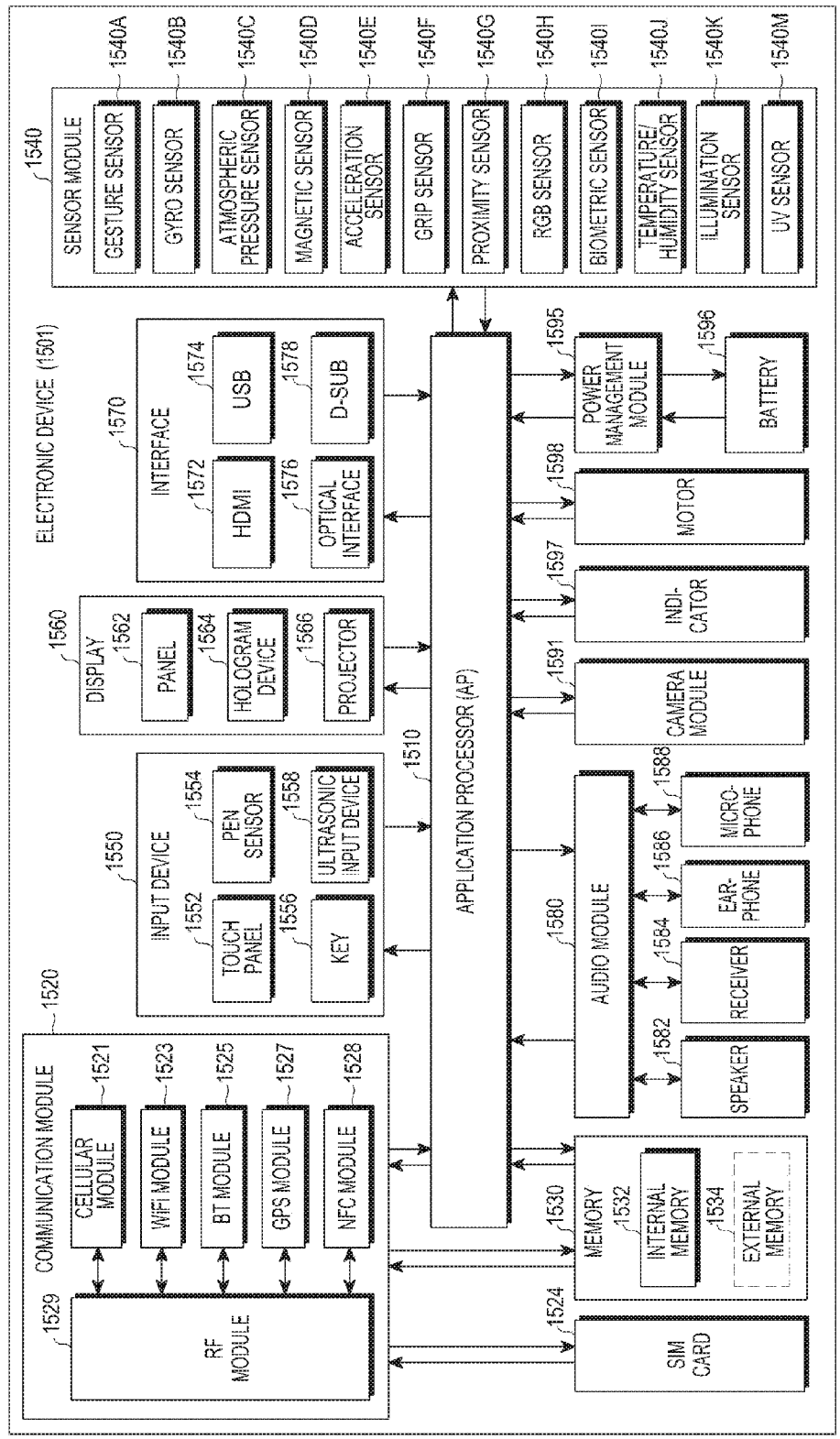
FIG. 15 is a block diagram illustrating a detailed structure of an electronic device according to various embodiments of the present disclosure.

FIG. 15 is a block diagram of an electronic device 1501 according to various embodiments of the present disclosure. The electronic device 1501 may constitute, for example, the entirety or a part of the electronic device 101 illustrated in FIG. 1.

Referring to FIG. 15, the electronic device 1501 may include at least one application processor (AP) 1510, a communication module 1520, a subscriber identification module (SIM) card 1524, a memory 1530, a sensor module 1540, an input device 1550, a display 1560, an interface 1570, an audio module 1580, a camera module 1591, a power management module 1595, a battery 1596, an indicator 1597, and a motor 1598.

The AP 1510 may drive an operation system or an application program to control a plurality of hardware or software components connected to the AP 1510, and may perform data processing and operations in association with various types of data including multimedia data. The AP 1510 may be embodied as, for example, a system on chip (SoC). According to an embodiment of the present disclosure, the AP 1510 may further include a graphics processing unit (GPU) (not illustrated).

The communication module 1520 (e.g., the communication interface 160) may perform data transmission/reception in communication between the electronic device 1501 (e.g., the electronic device 101) and other electronic devices (e.g., the electronic device 104 and the server 106) connected over a network. According to an embodiment, the communication module 1520 may include a cellular module 1521, a Wi-Fi module 1523, a BT module 1525, a GPS module 1527, an NFC module 1528, and a radio frequency (RF) module 1529.

The cellular module 1521 may provide a voice call, a video call, an SMS, an Internet service, or the like through a communication network (e.g., LTE, LTE-A, CDMA, WCDMA, UMTS, WiBro, GSM, or the like). Further, the cellular module 1521 may identify and authenticate an electronic device in a communication network using, for example, a SIM (e.g., the SIM card 1524). According to an embodiment of the present disclosure, the cellular module 1521 may perform at least some of the functions that the AP 1510 may provide. For example, the cellular module 1521 may perform at least some of the multimedia control functions.

According to an embodiment of the present disclosure, the cellular module 1521 may include a communication processor (CP). Furthermore, the cellular module 1521 may be embodied as, for example, an SoC. Although the components such as the cellular module 1521 (e.g., a CP), the memory 1530, the power management module 1595, and the like are illustrated to be separate from the AP 1510 in FIG. 15, the AP 1510 may be embodied to include at least some of the above described components (e.g., the cellular module 1521) according to an embodiment of the present disclosure.

According to an embodiment of the present disclosure, the AP 1510 or the cellular module 1521 (e.g., the CP) may load, to a volatile memory, an instruction or data received from at least one of a non-volatile memory and other components connected thereto, and may process the loaded instruction or data. Further, the AP 1510 or the cellular module 1521 may store data received from, or generated by, at least one of other components in a non-volatile memory.

Each of the Wi-Fi module 1523, the BT module 1525, the GPS module 1527, and the NFC module 1528 may include a processor for processing data transmitted/received through a corresponding module. Although the cellular module 1521, the Wi-Fi module 1523, the BT module 1525, the GPS module 1527, and the NFC module 1528 are shown as separate blocks in FIG. 15, at least some (e.g., two or more) of the cellular module 1521, the Wi-Fi module 1523, the BT module 1525, the GPS module 1527, and the NFC module 1528 may be included in one integrated chip (IC) or IC package according to an embodiment of the present disclosure. For example, at least some (e.g., a CP corresponding to the cellular module 1521 and a Wi-Fi processor corresponding to the Wi-Fi module 1523) of the processors corresponding to the cellular module 1521, the Wi-Fi module 1523, the BT module 1525, the GPS module 1527, and the NFC module 1528 may be embodied as a single SoC.

The RF module 1529 may transmit and receive data; for example, RF signals. Although not illustrated, the RF module 1529 may include, for example, a transceiver, a power amp module (PAM), a frequency filter, a low noise amplifier (LNA), or the like. In addition, the RF module 1529 may further include a component (for example, a conductor, a conducting wire, or the like) for transmitting/receiving electromagnetic waves over free air space in wireless communication. Although the cellular module 1521, the Wi-Fi module 1523, the BT module 1525, the GPS module 1527, and the NFC module 1528 are illustrated to share one RF module 1529 in FIG. 15, at least one of the cellular module 1521, the Wi-Fi module 1523, the BT module 1525, the GPS module 1527, and the NFC module 1528 may transmit/receive the RF signal through a separate RF module according to an embodiment of the present disclosure.

The SIM card 1524 may be a card that includes a SIM and may be inserted into a slot formed in a predetermined location of the electronic device. The SIM card 1524 may include unique identification information (e.g., an integrated circuit card identifier (ICCID)) or unique subscriber information (e.g., an international mobile subscriber identity (IMSI)).

The memory 1530 (e.g., memory 130) may include an embedded memory 1532 or an external memory 1534. The embedded memory 1532 may include, for example, at least one of a volatile memory (e.g., a dynamic random access memory (DRAM), a static RAM (SRAM), a synchronous dynamic RAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

According to an embodiment of the present disclosure, the embedded memory 1532 may be a solid state drive (SSD). The external memory 1534 may further include a flash drive (for example, a compact flash (CF), a secure digital (SD), a micro-SD, a mini-SD, an extreme digital (xD), a memory stick, or the like). The external memory 1534 may be functionally connected to the electronic device 1501 through various interfaces. According to an embodiment of the present disclosure, the electronic device 1501 may further include a storage device (or storage medium), such as a hard disc drive.

The sensor module 1540 may measure a physical quantity or sense an operational state of the electronic device 1501, and may convert the measured or sensed information to an electric signal. The sensor module 1540 may include at least one of, for example, a gesture sensor 1540A, a gyro sensor 1540B, an atmospheric pressure sensor 1540C, a magnetic sensor 1540D, an acceleration sensor 1540E, a grip sensor 1540F, a proximity sensor 1540G, a color sensor 1540H (e.g., a red/green/blue (RGB) sensor), a biometric sensor 1540I, a temperature/humidity sensor 1540J, an illumination sensor 1540K, and an ultraviolet (UV) sensor 1540M. Additionally or alternatively, the sensor module 1540 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor (not illustrated), an iris sensor (not illustrated), a fingerprint sensor (not illustrated), and the like. The sensor module 1540 may further include a control circuit for controlling one or more sensors included therein.

The input device 1550 may include a touch panel 1552, a (digital) pen sensor 1554, a key 1556, or an ultrasonic input device 1558. The touch panel 1552 may recognize a touch input based on at least one of, for example, a capacitive type, a resistive type, an infrared type, and an acoustic wave type. In addition, the touch panel 1552 may further include a control circuit. A capacitive touch panel may recognize a physical contact or proximity recognition. The touch panel 1552 may further include a tactile layer. In this instance, the touch panel 1552 may provide a tactile reaction to a user.

The touch panel 1552 may be embodied as at least one panel that may detect various inputs, such as a single or multi-touch input, a drag input, a writing input, a drawing input, and the like provided by a user using various objects such as a finger, a pen, and the like. For example, the touch panel 1552 may be embodied using a single panel capable of detecting both a finger input and a pen input, or may be embodied using two panels such as a touch recognition module capable of detecting a finger input and a pen recognition module capable of detecting a pen input. In the above described embodiments of the present disclosure, an example has been described through a case in which the touch panel 1552 is embodied by including two panels, such as a touch recognition module capable of detecting a finger input and a pen recognition module capable of detecting a pen input.

The touch panel 1552 may output, to a touch screen controller (not illustrated), an analog signal corresponding to at least one user input that is input to a user graphical interface. The touch panel 1552 may receive at least one user input through a body part of a user (e.g., fingers including an index finger). The touch panel 1552 may receive a continuous motion of a single touch. The touch panel 1552 may output, to a touch screen controller (not illustrated), an analog signal corresponding to a continuous motion of an input touch.

The touch described in various embodiments of the present disclosure is not limited to a contact between the touch panel 1552 and a user input means, such as a finger or the like, and may include a non-contact (e.g., a case in which a user input means is located within a recognition distance (e.g., 1 cm) where the user input means may be detected without a direct contact with the touch panel 1552). A distance or interval within which the user input means may be recognized by the touch panel 1552 may be changed according to a performance or structure of the electronic device 1501. Particularly, the touch panel 1552 is configured to output different values (e.g., a value including a voltage value or a current value as an analog value) for a value detected by a direct touch event and a value detected by a hovering event, so that the direct touch event by a contact with the user input means and the indirect touch event (that is, the hovering event) may be distinguished.

The touch panel 1552 may be embodied through, for example, a capacitive type, an infrared type, an acoustic wave type, or a combination thereof.

The touch screen controller may convert a signal input through the touch panel 1552 into a digital signal, and may transmit the same to the AP 1510. The AP 1510 may control a user interface displayed in the panel 1562 (e.g., a touch screen) of the display 1560, using a digital signal received from the touch screen controller. For example, the AP 1510 allows a short-cut icon (not shown) or an object displayed on the panel 1562 to be selected or executed in response to a direct touch event or a hovering event. Also, the touch screen controller may be integrated into the AP 1510.

The touch screen controller may determine a hovering interval or distance in addition to a position of the user input by detecting a value (e.g., a current value or the like) output through the touch panel 1552, and may convert the determined distance value to a digital signal (e.g., a Z coordinate) to provide the converted digital signal to the AP 1510. Further, the AP 1510 may detect various user inputs received through the camera module 1591, the input device 1550, the display 1560, the sensor module 1540, and the like, in addition to the touch panel 1552. The user input may include various types of information input into the electronic device 1501 (such as a gesture, a voice, a movement of a pupil, a biometric signal and the like of the user), in addition to the touch. The AP 1510 may control a predetermined operation or function corresponding to the detected user input to be performed.

The electronic (digital) pen sensor 1554 may be embodied, for example, using a method the same as or similar to a method of receiving a touch input of a user, or using a separate recognition sheet. The key 1556 may include, for example, a physical button, an optical key, or a keypad. The ultrasonic input device 1558 is a device that may detect ultrasonic waves, generated by an input tool, through a microphone (e.g., a microphone 1588) in the electronic device 1501, may identify data, and may perform wireless recognition. According to an embodiment of the present disclosure, the electronic device 1501 may also receive a user input from an external device (e.g., a computer or a server) connected thereto by using the communication module 1520.

The display 1560 (e.g., the display 150) may include a panel 1562, a hologram device 1564, or a projector 1566. The panel 1562 may be, for example, a liquid crystal display (LCD), an active matrix organic light emitting diode (AM-OLED), or the like. The panel 1562 may be embodied to be, for example, flexible, transparent, or wearable. The panel 1562 may be configured as a single module integrated with the touch panel 1552. The hologram device 1564 may show a three dimensional image in the air by using an interference of light. The projector 1566 may project light onto a screen to display an image. The screen may be located, for example, inside or outside the electronic device 1501. According to an embodiment of the present disclosure, the display 1560 may further include a control circuit for controlling the panel 1562, the hologram device 1564, or the projector 1566.

The interface 1570 may include, for example, an HDMI 1572, a USB 1574, an optical interface 1576, or a D-subminiature (D-sub) 1578. The interface 1570 may be included in, for example, the communication interface 160 illustrated in FIG. 1. Additionally or alternatively, the interface 1570 may, for example, include a mobile high-definition link (MHL) interface, an SD card/multi-media card (MMC) interface, or an infrared data association (IrDA) standard interface.

The audio module 1580 may bilaterally convert a sound and an electrical signal. At least some components of the audio module 1580 may be included in, for example, the input/output interface 140 illustrated in FIG. 1. The audio module 1580 may process sound information input or output through, for example, a speaker 1582, a receiver 1584, earphones 1586, the microphone 1588, or the like.

The camera module 1591 is a device that may photograph a still image and a dynamic image, and according to an embodiment of the present disclosure, may include one or more image sensors (e.g., a front sensor or a back sensor), a lens (not illustrated), an image signal processor (ISP) (not shown), or a flash (e.g., an LED or a xenon lamp, not illustrated).

The power management module 1595 may manage electric power of the electronic device 1501. Although not illustrated, the power management module 1595 may include, for example, a power management IC (PMIC), a charger IC, or a battery or fuel gauge.

The PMIC may be mounted within, for example, an integrated circuit or an SoC semiconductor. Charging methods may be classified into a wired charging method and a wireless charging method. The charger IC may charge a battery and may prevent an overvoltage or excess current from being induced or flowing from a charger. According to an embodiment of the present disclosure, the charger IC may include a charger IC for at least one of the wired charging and the wireless charging. Examples of the wireless charging may include magnetic resonance charging, magnetic induction charging, and electromagnetic charging, and an additional circuit, such as a coil loop, a resonance circuit, a rectifier, and the like, may be added for the wireless charging.

The battery gauge may measure, for example, a residual quantity of the battery 1596, and a voltage, a current, or a temperature while charging. The battery 1596 may store or generate electricity, and may supply power to the electronic device 1501 by using the stored or generated electricity. The battery 1596 may include, for example, a rechargeable battery or a solar battery.

The indicator 1597 may display a predetermined status of the electronic device 1501 or a part thereof (e.g., the AP 1510), for example, a boot-up status, a message status, a charging status, or the like. The motor 1598 may convert an electric signal to a mechanical vibration. Although not illustrated, the electronic device 1501 may include a processing device (e.g., a GPU) for supporting a mobile TV. The processing device for supporting the mobile TV may, for example, process media data according to a standard of digital multimedia broadcasting (DMB), digital video broadcasting (DVB), media flow, or the like.

Each of the above described elements of the electronic device according to various embodiments of the present disclosure may be formed of one or more components, and the name of a corresponding element may vary according to the type of an electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

The term "module" used in the various embodiments of the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to various embodiments of the present disclosure may include at least one of an application-specific IC (ASIC) chip, a field-programmable gate array (FPGA), and a programmable-logic device for performing certain operations, which are now known or will be developed in the future.

At least some of the devices (e.g., modules or functions thereof) or methods (e.g., operations) according to various embodiments of the present disclosure may be implemented by, for example, by a command stored in a non-transitory computer-readable recording medium in the form of a programming module. When the command is executed by one or more processors (for example, the processor 120), the one or more processors may execute a function corresponding to the command. The non-transitory computer-readable recording medium may be, for example, the memory 120. At least some of the programming modules may be implemented (for example, executed) by, for example, the processor 120. At least a part of the programming module may, for example, include a module, a program, a routine, a set of instructions, or a process for performing at least one function.

The computer readable recording medium may include magnetic media such as a hard disk, a floppy disk, and a magnetic tape, optical media such as a compact disc ROM (CD-ROM) and a DVD, magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The hardware device may be configured to operate as one or more software modules in order to perform operations of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

According to various embodiments of the present disclosure, the non-transitory computer-readable recording medium stores instructions, and the instructions are configured to enable at least one processor to execute at least one operation when the instructions are executed by the at least one processor, the one or more operations comprising: registering at least one handwritten signature input by a user input means, as reference signature data; when the handwritten signature is input by the user input means, comparing input handwritten signature data and the registered reference signature data; and when a result of the authentication shows that the input handwritten signature is normally authenticated, additionally registering the handwritten signature data associated with the input handwritten signature, as reference signature data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for an electronic device to process a signature input, the method comprising:
   repeatedly registering, as reference signature data, at least one handwritten signature input by a user input means as many times as a predetermined number of times, in the electronic device;
   determining a signature recognition rate of a user based on whether an authentication error is generated while a signature is input the predetermined number of times;
   adjusting a permissible threshold to be lowered when the signature recognition rate of the user is lower than a predetermined value, wherein the permissible threshold is set according to a type of the user input means and a reference value to be satisfied for a signature authentication; and
   when a handwritten signature data of the user is input for signature authentication, comparing the input handwritten signature data and the registered handwritten signature data, to authenticate the input handwritten signature data,
   wherein the authentication is executed to satisfy the adjusted permissible threshold.

2. The method as claimed in claim 1, wherein the authentication of the input handwritten signature is executed by taking into consideration the type of the user input means used for the input handwritten signature.

3. The method as claimed in claim 2, wherein the execution of the authentication by further taking into consideration the type of a user input means, comprises:
   executing authentication by further taking into consideration whether the type of the user input means used when a handwritten signature is registered and the type of the user input means used when a handwritten signature is authenticated are identical to each other.

4. The method as claimed in claim 1, wherein the authentication of the input handwritten signature is executed by further taking into consideration a grip state of a user input means used for the input handwritten signature.

5. The method as claimed in claim 1,
   wherein, when the handwritten signature is registered, registering at least one signature related information, and
   wherein the at least one signature related information includes one or more pieces of information selected from among hover data when a signature is input, a time expended for inputting a signature, a length of a stroke, a time expended for making a stroke, a ratio of width to height of a signature area, an area for each time, an entire area of an input signature, an average of signature coordinates, a grip state when a signature is input, and a signature input means.

6. An electronic device comprising:
a memory configured to store at least one registered handwritten signature as reference signature data;
an input interface configured to receive a handwritten signature that is input; and
a controller configured to:
  repeatedly register, as reference signature data, at least one handwritten signature input by a user input means as many times as a predetermined number of times, in the electronic device;
  determine a signature recognition rate of a user based on whether an authentication error is generated while a signature is input the predetermined number of times;
  adjust a permissible threshold to be lowered when the signature recognition rate of the user is lower than a predetermined value, wherein the permissible threshold is set according to a type of the user input means and a reference value to be satisfied for a signature authentication; and
  execute a process to compare the input handwritten signature data and the registered handwritten signature data when a handwritten signature data of the user is input by a user input means, to authenticate the input handwritten signature, and
  execute the authentication to satisfy the adjusted permissible threshold.

7. The electronic device as claimed in claim 6, wherein the controller is further configured to execute authentication by further taking into consideration the type of the user input means used for the input handwritten signature.

8. The electronic device as claimed in claim 7, wherein the controller is further configured to execute authentication by further taking into consideration whether the type of the user input means used when a handwritten signature is registered and the type of the user input means used when a handwritten signature is authenticated, are identical to each other.

9. The electronic device as claimed in claim 6, wherein the controller is further configured to execute authentication by further taking into consideration a grip state of a user input means used for the input handwritten signature.

10. The electronic device as claimed in claim 6,
  wherein the controller is further configured to register at least one signature related information when the handwritten signature is registered, and
  wherein the at least one signature related information includes one or more pieces of information selected from among hover data when a signature is input, a time expended for inputting a signature, a length of a stroke, a time expended for making a stroke, a ratio of width to height of a signature area, an area for each time, an entire area of an input signature, an average of signature coordinates, a grip state when a signature is input, and a signature input means.

* * * * *